US012351745B2

(12) United States Patent
Parquette et al.

(10) Patent No.: US 12,351,745 B2
(45) Date of Patent: Jul. 8, 2025

(54) SINGLE-COMPONENT ADHESIVE COMPOSITIONS

(71) Applicant: Ohio State Innovation Foundation, Columbus, OH (US)

(72) Inventors: Jon Parquette, Hilliard, OH (US); Scott Schricker, Columbus, OH (US); Nicholas Bewick, Troy, MI (US)

(73) Assignee: Ohio State Innovation Foundation, Columbus, OH (US)

( * ) Notice: Subject to any disclaimer, the term of this patent is extended or adjusted under 35 U.S.C. 154(b) by 844 days.

(21) Appl. No.: 17/431,392

(22) PCT Filed: Feb. 14, 2020

(86) PCT No.: PCT/US2020/018304
§ 371 (c)(1),
(2) Date: Aug. 16, 2021

(87) PCT Pub. No.: WO2020/168201
PCT Pub. Date: Aug. 20, 2020

(65) Prior Publication Data
US 2022/0135842 A1 May 5, 2022

Related U.S. Application Data

(60) Provisional application No. 62/806,261, filed on Feb. 15, 2019.

(51) Int. Cl.
C09J 4/00 (2006.01)
C08F 220/14 (2006.01)
C08F 222/10 (2006.01)
C08K 5/14 (2006.01)
C08K 5/18 (2006.01)
C08K 9/10 (2006.01)
C08L 61/24 (2006.01)

(52) U.S. Cl.
CPC .............. *C09J 4/00* (2013.01); *C08F 220/14* (2013.01); *C08F 222/1065* (2020.02); *C08K 5/14* (2013.01); *C08K 5/18* (2013.01); *C08K 9/10* (2013.01); *C08L 61/24* (2013.01)

(58) Field of Classification Search
CPC .... C09J 4/06; C08F 222/1065; C08F 222/102
See application file for complete search history.

(56) References Cited

U.S. PATENT DOCUMENTS

| 3,707,521 | A | 12/1972 | De Santis |
| 3,779,794 | A | 12/1973 | De Santis |
| 4,525,511 | A | 6/1985 | Kirby et al. |
| 4,808,639 | A | 2/1989 | Chernack |
| 4,918,136 | A | 4/1990 | Kawaguchi et al. |
| 5,154,762 | A | 10/1992 | Mitra et al. |
| 5,501,727 | A | 3/1996 | Wang et al. |
| 6,353,041 | B1 | 3/2002 | Qian |
| 6,998,111 | B2 | 2/2006 | Klee et al. |
| 7,214,726 | B2 | 5/2007 | Qian |
| 2004/0014860 | A1* | 1/2004 | Meier .................... C09J 175/00 524/394 |
| 2009/0192239 | A1 | 7/2009 | Hecht et al. |
| 2016/0355734 | A1 | 12/2016 | Zhou et al. |

FOREIGN PATENT DOCUMENTS

| CN | 105778783 | 7/2016 |
| JP | H07331187 | 12/1995 |
| WO | 93/012759 A1 | 7/1993 |
| WO | 2017/078883 | 5/2017 |
| WO | 2017/079189 | 5/2017 |
| WO | 2018/046438 A1 | 3/2018 |

OTHER PUBLICATIONS

The Extended European Search Report issued for European Application No. 20755193.8, dated Feb. 8, 2023.
Communication Pursuant to Rule 164(1)EPC issued for European Application No. 20755193.8, dated Nov. 8, 2022.
Cook, W. D. (1992) Photopolymerization Kinetics of Dimethacrylates Using the Camphorquinone Amine Initiator System, Polymer 33, 600-609.
Dulik, D. M. (1979) Evaluation of Commercial and Newly-Synthesized Amine Accelerators for Dental Composites, J. Dent. Res. 58, 1308-1316.
Chiang, C. C., Mouscadet, J. F., Tsai, H. J., Liu, C. T., and Hsu, L. Y. (2007) Synthesis and HIV-1 integrase inhibition of novel bis- or tetra-coumarin analogues, Chem. Pharm. Bull. 55, 1740-1743.
Antonucci, J. M., Grams, C. L., and Termini, D. J. (1979) New Initiator Systems for Dental Resins Based on Ascorbic-Acid, J. Dent. Res. 58, 1887-1899.
Hanabusa, M., Yoshihara, K., Yoshida, Y., Okihara, T., Yamamoto, T., Momoi, Y., and Van Meerbeek, B. (2016) Interference of functional monomers with polymerization efficiency of adhesives, Eur J Oral Sci 124, 204-209.
Olabisi, A. O., and Wimalasena, K. (2004) Rational approach to selective and direct 2-O-alkylation of 5,6-O-isopropylidine-L-ascorbic acid, J. Org. Chem. 69, 7026-7032.
Zhao, Y., Qu, B. Y., Wu, X. Y., Li, X. C., Liu, Q. Q., Jin, X. X., Guo, L., Hai, L., and Wu, Y. (2014) Design, synthesis and biological evaluation of brain targeting L-ascorbic acid prodrugs of ibuprofen with "lock-in" function, Eur. J. Med. Chem. 82, 314-323.

(Continued)

*Primary Examiner* — Gregory Listvoyb
(74) *Attorney, Agent, or Firm* — Meunier Carlin & Curfman LLC

(57) ABSTRACT

Disclosed are single component, stimuli-responsive adhesives that cure in response to an applied stimulus, including single component moisture-curable adhesives (e.g., moisture-curable (meth)acrylate/polyurethane hybrid adhesives). These adhesive compositions can combine the non-toxic, high strength properties of (meth)acrylate adhesives with the bonding characteristics of polyurethanes. The compositions described herein employ imitator systems which trigger polymerization/curing of the adhesive composition in response to a stimulus, such as ambient moisture, mild heat, and/or by physical stress. These strategies eliminate the need for mixing or an external energy stimulus to initiate curing. In this way, the benefits of polyurethane adhesive chemistry can be brought to the consumer market, in a system that is readily usable by the average individual.

20 Claims, 4 Drawing Sheets

(56) References Cited

OTHER PUBLICATIONS

Kote, S. R., Mishra, R., Khan, A. A., and Thopate, S. R. (2014) Synthesis and cytotoxic evaluation of novel 2,3-di-O-alkyl derivatives of L-ascorbic acid, Med. Chem. Res. 23, 1257-1266.
Schank, K., Bouillon, G., Funfrocken, M., Lick, C., and Lieder, R. (2002) Chemistry of free cyclic vicinal tricarbonyl compounds ('1,2,3-triones'). Part 2. Redox reactions of 1,2,3-triones with ene-1,2-diols ('reductones'), 2-alkoxy-en-1-ols, ene-1,2-diamines, and related species, Helv. Chim. Acta 85, 1295-1326.
International Search Report and Written Opinion, issued by the International Searching Authority (ISA/US) in PCT Application No. PCT/US2020/018304 on Jun. 15, 2020. 15 pages.
Hrabák, František, Vlasta Hynková, and Hana Pivcová. "3-and 4-dimethylaminobenzyl acrylate and methacrylate and their polymers." Die Makromolekulare Chemie: Macromolecular Chemistry and Physics 179.11 (1978): 2593-2601.

\* cited by examiner

ID="N" />

SINGLE-COMPONENT ADHESIVE COMPOSITIONS

CROSS-REFERENCE TO RELATED APPLICATIONS

This application is a national stage application filed under 35 U.S.C. § 371 of PCT/US2020/018304 filed Feb. 14, 2020, which claims benefit of priority of U.S. Provisional Application No. 62/806,261, filed Feb. 15, 2019, which is incorporated by reference herein in its entirety.

BACKGROUND

Adhesives are commonly used to join or fasten two or more adherends. Adherends are considered as being any two or more materials, or pieces of material that are being joined together, including wood, metals, paper, ceramics, stone, glass, concrete, etc. Adhesives used for these purposes are based on a wide range of technologies, including elastomer/solvent/resin mixtures, epoxies, latexes, polyurethanes, silicones, cyanoacrylates, acrylics, hot melts, and others. However, many existing adhesives have drawbacks, limiting their use in certain applications.

Adhesives based on elastomer/solvent/resin mixtures generally contain solvents which are toxic and, most often, flammable. Despite these hazards, such adhesives are popular due to their ease of use. Epoxy, acrylic, some polyurethane, and some silicone adhesives are formulated into two-component systems consisting of a base containing monomers, oligomers, and polymers, and a hardener or curative component, consisting of catalysts and curing agents. These systems require accurate measuring and thorough mixing to develop the properties that make them useful as adhesives. The individual raw materials in two-component adhesive products, monomers, oligomers, catalysts, and curing agents, can be toxic and often allergenic. Latex adhesives are low toxicity, non-flammable materials, which harden through evaporation of water. While effective in many applications, latex adhesives do not perform well in low temperature environments, on metals, on many plastics, and in wet or humid environments. In conditions of low temperature or high humidity, the drying time of latex adhesives can be greatly extended, sometimes for days. On the other hand, hot melt adhesives, being thermoplastic, lose strength in warm conditions, limiting the applications in which they can be used. Additionally, hot melt adhesives require a source of heat for application, which further limits their use. These heat sources and the application of hot adhesive present a safety (burn) hazard to the user.

Single component adhesives, such as polyurethanes and silicones, cure by reaction with moisture in air or on the adherends. Existing polyurethanes develop tack slowly, requiring that the adherends be held or fixtured in place (bracing or taping) until the adhesive has cured enough to hold them in place without being held. The same applies for single component silicone adhesives. Further, in a portion of the population, allergic reactions can result from exposure to the monomers in polyurethane adhesives. In addition to the problems listed above, solvent and water-based adhesives generally exhibit a high degree of shrinkage due to the volatile content of the adhesives.

Accordingly, improved adhesive compositions are needed.

SUMMARY

Disclosed are single component stimuli-responsive adhesives that cure in response to an applied stimulus, including single component moisture-curable adhesives. The adhesives can include a curable mixture comprising one or more ethylenically unsaturated monomers and a stimuli-responsive initiator package. In some cases, the adhesive can comprise a (meth)acrylate/polyurethane hybrid adhesive (i.e., the one or more ethylenically unsaturated monomers can comprise a urethane (meth)acrylate monomer). These adhesive compositions can combine the non-toxic, high strength properties of (meth)acrylate adhesives with the bonding characteristics of polyurethanes.

Stimuli-responsive (e.g., moisture-cured) (meth)acrylates have the potential to be a disruptive technology in consumer adhesives. Despite the utility of (meth)acrylate adhesive chemistry, applications have been largely limited to industrial and biomedical issues. This is due to the curing mechanism, which is initiated by either, heat, light or mixing a two-component redox system. Provided herein are strategies to create single-component (meth)acrylate adhesive systems in which the polymerization/curing reaction is triggered by ambient moisture, mild heat, and/or by physical contact between two surfaces. These strategies eliminate the need for mixing or an external energy stimulus to initiate curing. In this way, the benefits of polyurethane adhesive chemistry can be brought to the consumer market, in a system that is readily usable by the average individual.

In some embodiments, the adhesive composition can be formulated such a physical stimulus (e.g., physical contact between two surfaces to which the adhesive composition is applied) and/or mild heat (40° C. or less) will initiate polymerization/curing of the adhesive (e.g., the (meth)acrylate/polyurethane hybrid adhesive). For example, such compositions can include a two-component initiator package (e.g., an oxidant, such as a peroxide and an amine, or an oxidant such as a peroxide and an ascorbic acid derivative). A first component of the initiator package (e.g., the amine or the ascorbic acid derivative) can segregated from a second component of the initiator package (e.g., an oxidant that can generate a free radical upon reaction with the amine or the ascorbic acid derivative, such as a peroxide) by physically encapsulating the first component within microcapsules. The microencapsulation process physically sequesters the first component (e.g., the amine or ascorbic acid derivative) from the oxidant such as the peroxide (e.g., t-butylperoxybenzoate) in the adhesive composition, thereby preventing the reaction that initiates the curing process. The amine and/or ascorbic acid derivative can be selected so as to possess a molecular weight, hydrophobicity, or combination thereof effective to limit diffusion of the first component from the microcapsules. The adhesive composition cures when a stimulus is applied to rupture the microcapsules and release the first component (e.g., the amine or ascorbic acid derivative). For example, curing can proceed when the microcapsules are crushed or ruptured between two surfaces that are being glued.

In other embodiments, the adhesive composition can be formulated such that the presence of ambient moisture (water) can trigger the polymerization/curing of the adhesive (e.g., the (meth)acrylate/polyurethane hybrid adhesive). These compositions can include a water-activated initiating system. The water-activated initiating system can comprise an oxidant, such as a peroxide, and an ascorbic acid derivative (ascorbic acid protected with water-sensitive protecting groups that are removed in the presence of trace water moisture).

The polymerization of ethylenically unsaturated monomers, such as (meth)acrylate monomers, can be efficiently initiated with a catalyst composed of ascorbic acid and an oxidant such as a peroxide. In these systems, the oxidant (e.g., the peroxide) oxidizes the ascorbic acid, which then serves to initiate a radical polymerization of the monomers. Protecting the hydroxyl groups at C-2 and C-3 of ascorbic acid (e.g., using an electron-withdrawing group such as an acyl group) prevents oxidation by the peroxide, thus preventing the curing reaction from proceeding. The presence of small amounts of water, in the form of added water or atmospheric moisture, can hydrolyze these protecting groups regenerating the ascorbic acid, thus inducing the curing process. Protection of the hydroxyl groups at C-5 and C-6 of ascorbic acid can modulate the solubility/dispersibility of the ascorbic acid derivative in the adhesive composition.

By way of example, the water-activated initiating system can comprise (R)-2-((S)-2,2-dimethyl-1,3-dioxolan-4-yl)-5-oxo-2,5-dihydrofuran-3,4-diyl bis(2,2,2-trifluoroacetate) (an ascorbic acid derivative) in combination with tert-butylperoxybenzoate. This system can be used to provide adhesive compositions that are stable until water is added or the mixture is exposed to the ambient atmosphere, but cure within 1 minute upon exposure to water. This system can be used to formulate single-component adhesive compositions in contrast to current two-component system systems in which the initiators must be segregated.

Also provided are ascorbic acid derivatives in which the hydroxyl groups at C-2 and C-3 of ascorbic acid are protected (e.g., using an electron-withdrawing group such as an acyl group) to prevent oxidation the peroxide. In some cases, the ascorbic acid derivative can be defined by Formula I below

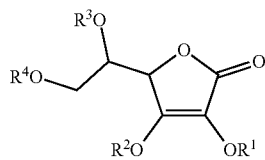

Formula I wherein $R^1$ and $R^2$ are each independently selected from hydrogen, alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, —$SiR^5R^6R^7$, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$, with the proviso that at least one of $R^1$ and $R^2$ is not hydrogen;

$R^3$ and $R^4$ are each independently selected from hydrogen, alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, and alkylheteroaryl, each optionally substituted with one or more substituents individually selected from $R^8$; or $R^3$ and $R^4$, together with the atoms to which they are attached, form a 5-7 membered heterocyclic ring optionally substituted with one or more substituents individually selected from $R^8$;

$R^5$, $R^6$, and $R^7$ are each independently selected from alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, and alkylheteroaryl, each optionally substituted with one or more substituents individually selected from $R^8$; and $R^8$ is, independently for each occurrence, selected from hydroxy, halogen, —CN, —$NO_2$, —$SF_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkyl sulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl.

In some embodiments of Formula I, $R^1$ and $R^2$ are each independently selected from alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, —$SiR^5R^6R^7$, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$.

In some embodiments of Formula I, $R^1$ and $R^2$ are each independently selected from —$SiR^5R^6R^7$, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$.

In some embodiments of Formula I, $R^1$ and $R^2$ are each independently $C_1$-$C_4$ alkylcarbonyl or $C_1$-$C_4$ haloalkylcarbonyl.

In some embodiments of Formula I, $R^1$ and $R^2$ are each independently an electron withdrawing moiety.

In some embodiments of Formula I, $R^1$ and $R^2$ are each independently a hydrolysable moiety.

In some embodiments of Formula I, $R^1$ and $R^2$ are each independently a light-sensitive moiety.

In some embodiments of Formula I, $R^4$ is $C_1$-$C_{18}$ alkylcarbonyl.

In some embodiments of Formula I, $R^3$ and $R^4$ are each independently $C_1$-$C_4$ alkylcarbonyl or $C_1$-$C_4$ haloalkylcarbonyl.

In some embodiments of Formula I, $R^3$, $R^4$, or a combination thereof include an ethylenically unsaturated moiety, such as an acrylate moiety, a methacrylate moiety, or a vinyl moiety.

In some embodiments, the ascorbic acid derivative can be one of the following

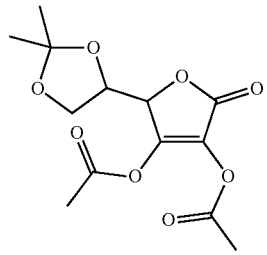

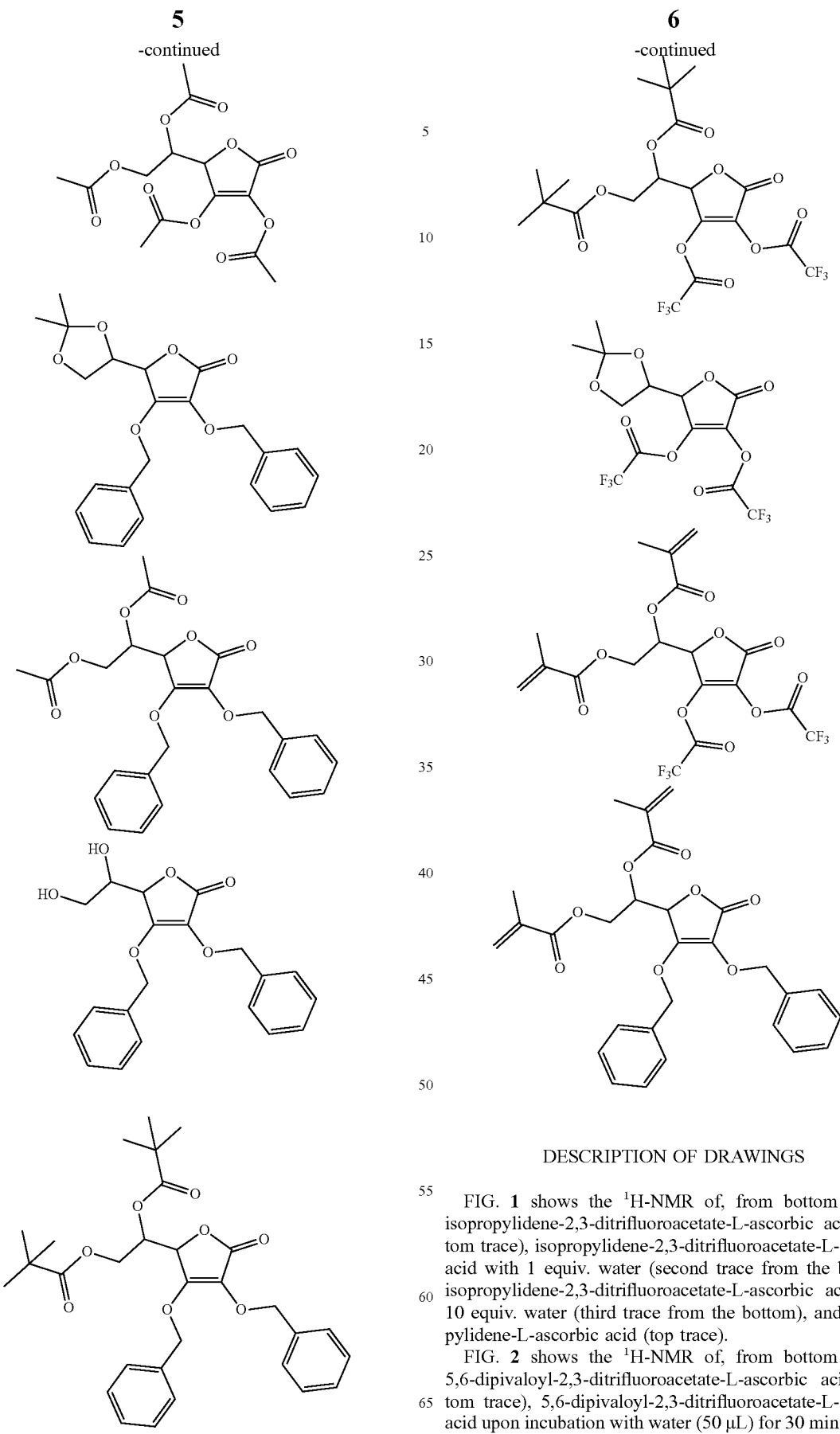

DETAILED DESCRIPTION

Figure 1:
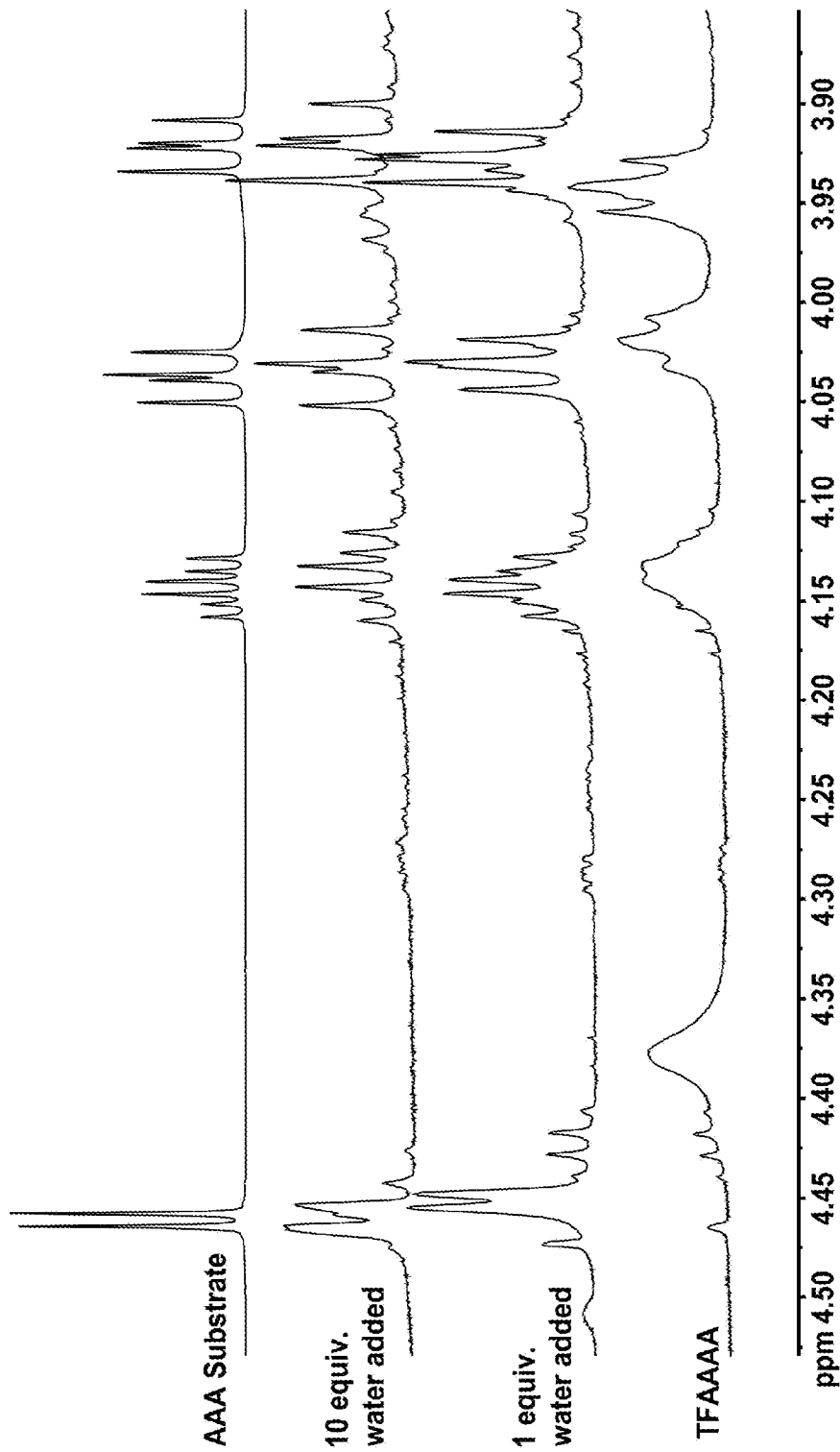
FIG. 1 shows the $^1$H-NMR of, from bottom to top, isopropylidene-2,3-ditrifluoroacetate-L-ascorbic acid (bottom trace), isopropylidene-2,3-ditrifluoroacetate-L-ascorbic acid with 1 equiv. water (second trace from the bottom), isopropylidene-2,3-ditrifluoroacetate-L-ascorbic acid with 10 equiv. water (third trace from the bottom), and isopropylidene-L-ascorbic acid (top trace).

The compositions, and methods described herein may be understood more readily by reference to the following detailed description of specific aspects of the disclosed subject matter and the Examples included therein.

Before the present compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

As used herein, "hardening" or "curing" a composition are used interchangeably and refer to polymerization and/or crosslinking reactions including, for example, photopolymerization reactions and chemical polymerization techniques (e.g., ionic reactions or chemical reactions forming radicals effective to polymerize ethylenically unsaturated compounds) involving one or more materials included in the composition.

The term "hydrophobic," as used herein, refers to an amine which exhibits a higher solubility in octanol than in water.

Chemical Definitions

Chemical terms used herein will have their customary meaning in the art unless specified otherwise. The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, heteroatoms present in a compound or moiety, such as nitrogen, can have hydrogen substituents and/or any permissible substituents of organic compounds described herein which satisfy the valency of the heteroatom. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound (e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

As used herein, the prefix "(meth)acryl . . . " includes both "methacryl . . . " and "acryl . . . ". Thus, for example, the phrase "urethane di(meth)acrylate" includes both "urethane dimethacrylates" and "urethane diacrylates."

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may be unsubstituted or substituted with one or more chemical moieties. The alkyl group can be substituted with one or more groups including, but not limited to, hydroxy, halogen, acyl, alkyl, alkoxy, alkenyl, alkynyl, aryl, heteroaryl, acyl, aldehyde, amino, carboxylic acid, ester, ether, ketone, nitro, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure —CH=$CH_2$; 1-propenyl refers to a group with the structure -CH=CH—$CH_3$; and 2-propenyl refers to a group with the structure —$CH_2$—CH=$CH_2$. Asymmetric structures such as $(Z^1Z^2)C=C(Z^3Z^4)$ are intended to include both the E and Z isomers. This can be presumed in structural formulae herein wherein an asymmetric alkene is present, or it can be explicitly indicated by the bond symbol C=C. Alkenyl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, ester, ether, halide, hydroxy, ketone, nitro, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, ester, ether, halide, hydroxy, ketone, nitro, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 20 carbon atoms. Aryl groups can include a single ring or multiple condensed rings. In some embodiments, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some embodiments, the aryl group can be a phenyl, indanyl or naphthyl group. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl or heteroaryl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, cycloalkyl, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acyl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "acyl" as used herein is represented by the formula —C(O)$Z^1$ where $Z^1$ can be a hydrogen, hydroxyl, alkoxy, alkyl, halogenated alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a short hand notation for C=O.

As used herein, the term "alkoxy" refers to a group of the formula $Z^1$—O—, where $Z^1$ is unsubstituted or substituted alkyl as defined above. Unless otherwise specified, alkoxy groups wherein $Z^1$ is a $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-pentoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

The term "aldehyde" as used herein is represented by the formula —C(O)H.

The terms "amine" or "amino" as used herein are represented by the formula —N$Z^1Z^2$, where $Z^1$ and $Z^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is —C(O)N$Z^1Z^2$.

The term "carboxylic acid" as used herein is represented by the formula —C(O)OH. A "carboxylate" or "carboxyl" group as used herein is represented by the formula —C(O)O$^-$.

The term "ester" as used herein is represented by the formula —OC(O)$Z^1$ or —C(O)O$Z^1$, where $Z^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1$O$Z^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $Z^1$C(O)$Z^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —NO$_2$.

The term "silyl" as used herein is represented by the formula —Si$Z^1Z^2Z^3$, where $Z^1$, $Z^2$, and $Z^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the group represented by the formula —S(O)$_2Z^1$, where $Z^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

The term "thiol" as used herein is represented by the formula —SH.

The term "thio" as used herein is represented by the formula —S—.

As used herein, Me refers to a methyl group; OMe refers to a methoxy group; and i-Pr refers to an isopropyl group.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As used herein, the term "(meth)acrylate monomer" includes acrylate, methacrylate, diacrylate, and dimethacrylate monomers Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Reference will now be made in detail to specific aspects of the disclosed materials, compounds, compositions, and methods, examples of which are illustrated in the accompanying Examples.

Adhesive Compositions

Disclosed are single component stimuli-responsive adhesives that cure in response to an applied stimulus, including single component moisture-curable adhesives. The adhesives can include a curable mixture comprising one or more ethylenically unsaturated monomers, and a stimuli-responsive initiator package. In some cases, the adhesive can comprise a (meth)acrylate/polyurethane hybrid adhesive (i.e., the one or more ethylenically unsaturated monomers can comprise a urethane (meth)acrylate monomer). These adhesive compositions can combine the non-toxic, high strength properties of (meth)acrylate adhesives with the bonding characteristics of polyurethanes.

Moisture-cured (meth)acrylates have the potential to be a disruptive technology in consumer adhesives. Despite the utility of (meth)acrylate adhesive chemistry, applications have been largely limited to industrial and biomedical issues. This is due to the curing mechanism, which is initiated by either, heat, light or mixing a two-component redox system. Provided herein are strategies to create single-component (meth)acrylate adhesive systems in which the polymerization/curing reaction is triggered by ambient moisture, mild heat, and/or by physical contact between two surfaces. These strategies eliminate the need for mixing or an external energy stimulus to initiate curing. In this way, the benefits of polyurethane adhesive chemistry can be brought to the consumer market, in a system that is readily usable by the average individual.

In some embodiments, the adhesive composition can be formulated such a physical stimulus (e.g., physical contact between two surfaces to which the adhesive composition is applied) and/or mild heat (40° C. or less) will initiate polymerization/curing of the adhesive (e.g., the (meth)acrylate/polyurethane hybrid adhesive). For example, such compositions can include a two-component initiator package (e.g., a peroxide and an amine, or a peroxide and an ascorbic acid derivative). A first component of the initiator package (e.g., the amine or the ascorbic acid derivative) can segregated from a second component of the initiator package (e.g., the peroxide) by physically encapsulating the first component within microcapsules. The microencapsulation process physically sequesters the first component (e.g., the amine or ascorbic acid derivative) from the peroxide (e.g., t-butylperoxybenzoate) in the adhesive composition, thereby preventing the reaction that initiates the curing process. The amine and/or ascorbic acid derivative can be selected so as to possess a molecular weight, hydrophobicity, or combination thereof effective to limit diffusion of the first component from the microcapsules. The adhesive composition cures when a stimulus is applied to rupture the microcapsules and release the first component (e.g., the amine or ascorbic acid derivative). For example, curing can proceed when the microcapsules are crushed or ruptured between two surfaces that are being glued.

Accordingly, provided herein are single-component adhesive compositions that comprise a curable mixture comprising a curable mixture comprising an ethylenically unsaturated monomer; a peroxide; and a microencapsulated hydrophobic amine having a molecular weight of at least 175 Da dispersed within the curable mixture.

In some embodiments, the hydrophobic amine can have a molecular weight of at least 175 Da (e.g., at least 200 Da, at least 225 Da, at least 250 Da, at least 275 Da, at least 300 Da, at least 325 Da, at least 350 Da, at least 375 Da, at least 400 Da, at least 425 Da, at least 450 Da, at least 475 Da, at least 500 Da, at least 525 Da, at least 550 Da, at least 575 Da, at least 600 Da, at least 625 Da, at least 650 Da, at least 675 Da, at least 700 Da, at least 725 Da, at least 750 Da, at least 775 Da, at least 800 Da, at least 825 Da, at least 850 Da, at least 875 Da, at least 900 Da, at least 925 Da, at least 950 Da, at least 975 Da, at least 1,000 Da, at least 1,025 Da, at least 1,050 Da, at least 1,075 Da, at least 1,100 Da, at least 1,125 Da, at least 1,150 Da, at least 1,175 Da, at least 1,200 Da, at least 1,225 Da, at least 1,250 Da, at least 1,275 Da, at least 1,300 Da, at least 1,325 Da, at least 1,350 Da, at least 1,375 Da, at least 1,400 Da, at least 1,425 Da, at least 1,450 Da, or at least 1,475 Da). In some embodiments, the hydrophobic amine can have a molecular weight of 1,500 Da or less (e.g., 1,475 Da or less, 1,450 Da or less, 1,425 Da or less, 1,400 Da or less, 1,375 Da or less, 1,350 Da or less, 1,325 Da or less, 1,300 Da or less, 1,275 Da or less, 1,250 Da or less, 1,225 Da or less, 1,200 Da or less, 1,175 Da or less, 1,150 Da or less, 1,125 Da or less, 1,100 Da or less, 1,075 Da or less, 1,050 Da or less, 1,025 Da or less, 1,000 Da or less, 975 Da or less, 950 Da or less, 925 Da or less, 900 Da or less, 875 Da or less, 850 Da or less, 825 Da or less, 800 Da or less, 775 Da or less, 750 Da or less, 725 Da or less, 700 Da or less, 675 Da or less, 650 Da or less, 625 Da or less, 600 Da or less, 575 Da or less, 550 Da or less, 525 Da or less, 500 Da or less, 475 Da or less, 450 Da or less, 425 Da or less, 400 Da or less, 375 Da or less, 350 Da or less, 325 Da or less, 300 Da or less, 275 Da or less, 250 Da or less, 225 Da or less, or 200 Da or less).

The hydrophobic amine can have a molecular weight ranging from any of the minimum molecular weights described above to any of the maximum molecular weights described above. For example, the hydrophobic amine can have a molecular weight of from 250 Da to 1,500 Da, such as from 250 Da to 1,000 Da, or from 300 Da to 500 Da.

The hydrophobic amine can comprise from 0.5% to 5% by weight (e.g., from 1% to 5% by weight, or from 3% to 5% by weight) of the adhesive composition, based on the total weight of the adhesive composition.

In some embodiments, the hydrophobic amine can comprise a tertiary amine. In certain embodiments, the hydrophobic amine can comprise an aromatic tertiary amine.

In some embodiments, the hydrophobic amine can include an ethylenically unsaturated moiety, such as an acrylate moiety, a methacrylate moiety, or a vinyl moiety.

In some embodiments, the hydrophobic amine can be defined by Formula II below

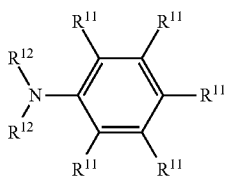

Formula II wherein $R^{11}$ is, independently for each occurrence, selected from hydrogen, hydroxy, halogen, —CN, —NO$_2$, silyl, amino, alkylamino, dialkylamino, alkyl, heteroalkyl, haloalkyl, alkylthio, haloalkylthio, alkoxy, haloalkoxy, alkenyl, haloalkenyl, alkynyl, haloalkynyl, alkylsulfonyl, haloalkylsulfinyl, alkylsulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, heterodialkylaminocarbonyl, cycloalkyl, alkylcycloalkyl, cycloalkylalkyl, heterocyclyl, alkylheterocyclyl, heterocyclylalkyl, aryl, alkylaryl, alkylaryl, heteroaryl, and alkylheteroaryl, each optionally substituted with one or more substituents individually selected from $R^8$;

$R^{12}$ is, independently for each occurrence, selected from alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$; and $R^8$ is, independently for each occurrence, selected from hydroxy, halogen, —CN, —NO$_2$, —SF$_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkylsulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl.

In some embodiments, $R^{12}$ can be, independently for each occurrence, selected from alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, and alkylheteroaryl, each optionally substituted with one or more substituents individually selected from $R^8$.

In some embodiments, $R^{12}$ can be, independently for each occurrence, selected from alkyl, heteroalkyl, and haloalkyl, each optionally substituted with one or more substituents individually selected from $R^8$.

In some embodiments, $R^{12}$ can be, independently for each occurrence, hydrogen or C$_1$-C$_6$ alkyl. In other embodiments, $R^{11}$ can comprise an ethylenically unsaturated moiety.

In certain embodiments, the hydrophobic amine can be defined by Formula IIA

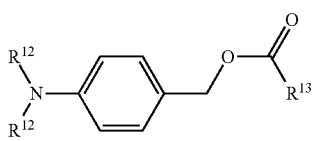

Formula IIA wherein $R^{12}$ is, independently for each occurrence, selected from alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, each optionally substituted with one or more substituents individually selected from $R^8$;

$R^8$ is, independently for each occurrence, selected from hydroxy, halogen, —CN, —NO$_2$, —SF$_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkyl sulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl; and $R^{13}$ is selected from alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, alkylaryl, heteroaryl, and alkylheteroaryl, each optionally substituted with one or more substituents individually selected from $R^8$.

In some embodiments, $R^{12}$ can be, independently for each occurrence, selected from alkyl, heteroalkyl, and haloalkyl, each optionally substituted with one or more substituents individually selected from $R^8$. In other embodiments, $R^{12}$ can comprise an ethylenically unsaturated moiety.

In some embodiments, can be selected from $R^{13}$ is alkyl, heteroalkyl, haloalkyl, alkenyl, haloalkenyl, alkynyl, and haloalkynyl, each optionally substituted with one or more substituents individually selected from $R^8$. In certain embodiments, $R^{13}$ can comprise an ethylenically unsaturated moiety.

In some embodiment, the hydrophobic amine can be a compound defined by Formula IIB

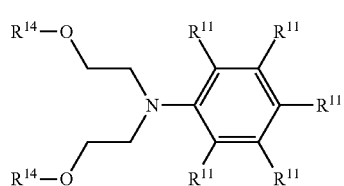

Formula IIB wherein $R^{11}$ is, independently for each occurrence, hydrogen, hydroxy, halogen, —CN, —NO$_2$, silyl, amino, alkylamino, dialkylamino, alkyl, haloalkyl, alkylthio, haloalkylthio, alkoxy, haloalkoxy, alkenyl, haloalkenyl, alkynyl, haloalkynyl, alkylsulfinyl, haloalkylsulfinyl, alkylsulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, heterodialkylaminocarbonyl, cycloalkyl, alkylcycloalkyl, cycloalkylalkyl, heterocyclyl, alkylheterocyclyl, heterocyclylalkyl, aryl, alkylaryl, alkylaryl, heteroaryl, and alkylheteroaryl, each optionally substituted with one or more substituents individually selected from $R^8$;

$R^{14}$ is, independently for each occurrence, selected from hydrogen, alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, —$SiR^5R^6R^7$, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$; and $R^8$ is, independently for each occurrence, selected from hydroxy, halogen, —CN, —$NO_2$, —$SF_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkyl sulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl.

In some embodiments, $R^{14}$ can be, independently for each occurrence, selected from —$SiR^5R^6R^7$, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$.

In some embodiments, $R^{14}$ can be, independently for each occurrence, $C_1$-$C_{22}$ alkylcarbonyl or $C_1$-$C_{22}$ haloalkylcarbonyl. In some embodiments, $R^{12}$ can be, independently for each occurrence, trialkylsilyl or trihaloalkylsilyl.

In some embodiments, $R^{11}$ can be, independently for each occurrence, hydrogen or $C_1$-$C_6$ alkyl. In other embodiments, $R^{11}$ can comprise an ethylenically unsaturated moiety.

In some examples, the hydrophobic amine can be one of the following:

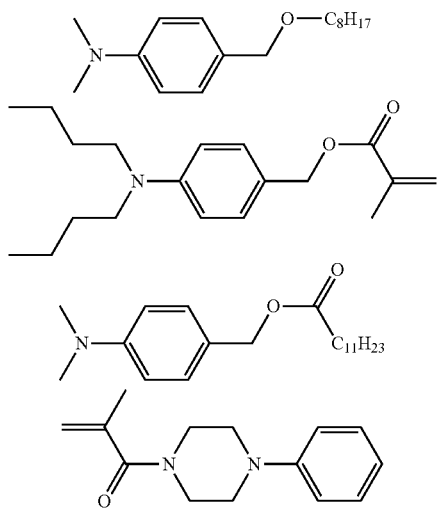

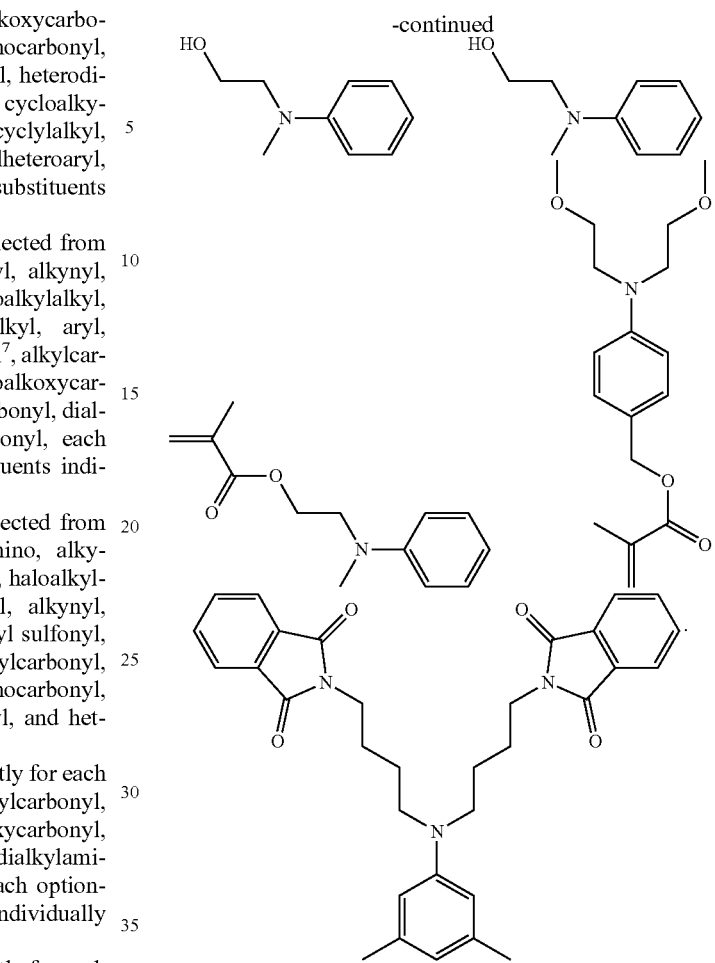

Also provided are single-component adhesive compositions that comprise a curable mixture comprising an ethylenically unsaturated monomer; a peroxide; and a microencapsulated ascorbic acid derivative having a molecular weight of at least 175 Da dispersed within the curable mixture.

In some embodiments, the ascorbic acid derivative can have a molecular weight of at least 175 Da (e.g., at least 200 Da, at least 225 Da, at least 250 Da, at least 275 Da, at least 300 Da, at least 325 Da, at least 350 Da, at least 375 Da, at least 400 Da, at least 425 Da, at least 450 Da, at least 475 Da, at least 500 Da, at least 525 Da, at least 550 Da, at least 575 Da, at least 600 Da, at least 625 Da, at least 650 Da, at least 675 Da, at least 700 Da, at least 725 Da, at least 750 Da, at least 775 Da, at least 800 Da, at least 825 Da, at least 850 Da, at least 875 Da, at least 900 Da, at least 925 Da, at least 950 Da, at least 975 Da, at least 1,000 Da, at least 1,025 Da, at least 1,050 Da, at least 1,075 Da, at least 1,100 Da, at least 1,125 Da, at least 1,150 Da, at least 1,175 Da, at least 1,200 Da, at least 1,225 Da, at least 1,250 Da, at least 1,275 Da, at least 1,300 Da, at least 1,325 Da, at least 1,350 Da, at least 1,375 Da, at least 1,400 Da, at least 1,425 Da, at least 1,450 Da, or at least 1,475 Da). In some embodiments, the ascorbic acid derivative have a molecular weight of 1,500 Da or less (e.g., 1,475 Da or less, 1,450 Da or less, 1,425 Da or less, 1,400 Da or less, 1,375 Da or less, 1,350 Da or less, 1,325 Da or less, 1,300 Da or less, 1,275 Da or less, 1,250 Da or less, 1,225 Da or less, 1,200 Da or less, 1,175 Da or less, 1,150 Da or less, 1,125 Da or less, 1,100 Da or less, 1,075 Da or less, 1,050 Da or less, 1,025 Da or less, 1,000 Da or less, 975 Da or less, 950 Da or less, 925 Da or less, 900 Da or less, 875 Da or less, 850 Da or less, 825 Da or less, 800 Da or less, 775 Da or less, 750 Da or less, 725 Da or less, 700 Da or less, 675 Da or less, 650 Da or less, 625 Da or less, 600 Da or less, 575 Da or less, 550 Da or less, 525 Da or less, 500 Da or less, 475 Da or less, 450 Da or less, 425 Da or less, 400 Da or less, 375 Da or less, 350 Da or less, 325 Da or less, 300 Da or less, 275 Da or less, 250 Da or less, 225 Da or less, or 200 Da or less).

The ascorbic acid derivative can have a molecular weight ranging from any of the minimum molecular weights described above to any of the maximum molecular weights described above. For example, the ascorbic acid derivative can have a molecular weight of from 250 Da to 1,500 Da, such as from 250 Da to 1,000 Da, or from 300 Da to 500 Da.

The ascorbic acid derivative can comprise from 0.5% to 5% by weight (e.g., from 1% to 5% by weight, or from 3% to 5% by weight) of the adhesive composition, based on the total weight of the adhesive composition.

In some embodiments, the ascorbic acid derivative can be hydrophobic.

In some embodiments, the ascorbic acid derivative can include an ethylenically unsaturated moiety, such as an acrylate moiety, a methacrylate moiety, or a vinyl moiety.

In some embodiments, the ascorbic acid derivative can be defined by Formula III below

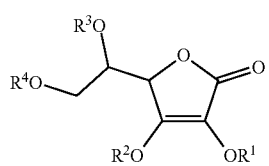

Formula III wherein $R^1$ and $R^2$ are each independently selected from hydrogen, alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, —$SiR^5R^6R^7$, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$;

$R^3$ and $R^4$ are each independently selected from hydrogen, alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, and alkylheteroaryl, each optionally substituted with one or more substituents individually selected from $R^8$; or $R^3$ and $R^4$, together with the atoms to which they are attached, form a 5-7 membered heterocyclic ring optionally substituted with one or more substituents individually selected from $R^8$;

$R^5$, $R^6$, and $R^7$ are each independently selected from alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, and alkylheteroaryl, each optionally substituted with one or more substituents individually selected from $R^8$; and $R^8$ is, independently for each occurrence, selected from hydroxy, halogen, —CN, —$NO_2$, —$SF_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkyl sulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl.

In some embodiments, $R^1$, $R^2$, or a combination thereof are hydrogen.

In some embodiments, $R^4$ is $C_1$-$C_{18}$ alkylcarbonyl.

In some embodiments, $R^3$ and $R^4$ are each independently $C_1$-$C_4$ alkylcarbonyl or $C_1$-$C_4$ haloalkylcarbonyl.

In some embodiments, $R^3$, $R^4$, or a combination thereof can include an ethylenically unsaturated moiety, such as an acrylate moiety, a methacrylate moiety, or a vinyl moiety.

The microencapsulated hydrophobic amine and/or ascorbic acid derivative can comprise microcapsules encapsulating the hydrophobic amine and/or ascorbic acid derivative. The microcapsules encapsulating the hydrophobic amine and/or ascorbic acid derivative can be dispersed within the curable mixture and present in an amount sufficient to cure the resin. Upon the application of pressure, abrasive action, shear stress or other mechanical manipulation, the microcapsules are ruptured whereupon the hydrophobic amine and/or ascorbic acid derivative is released into coating relationship with the resin and peroxide to form an active adhesive which will thereafter cure and harden. Prior to rupturing of the microcapsules and release of the amine and/or ascorbic acid derivative, the adhesive composition can be liquid or viscous so that it may easily be applied to the substrates or adherends.

Microencapsulation is known in the art, and any suitable known method may be used to divide the core material, here the amine and/or ascorbic acid derivative, into minute liquid particles and to surround the divided amine and/or ascorbic acid derivative particles by rupturable enveloping shells. In all microencapsulation methods, the amine and/or ascorbic acid derivative is divided into minute particles which are surrounded by rupturable envelopes, membranes or shells of suitable material. While many materials known in the art may be utilized in various microencapsulation processes, it is to be understood in assessing the suitability of the microcapsule shell material that the resulting shell must be sufficiently thin to rupture upon mechanical manipulation such as pressure, abrading action, shear stress, and/or mild temperature (a temperature of from 25° C. to 40° C.). On the other hand, the shell material must be of sufficient thickness to prevent premature release of the amine and/or ascorbic acid derivative during storage of the yet inactive adhesive composition and during its application to the substrates to be joined. It should also be understood that the shells of the microcapsules should be sufficiently thick and/or of suitable material to prevent diffusion of the amine and/or ascorbic acid derivative from the microcapsules and/or withstand any chemical attack or destruction by the uncured adhesive or by the encapsulated amine and/or ascorbic acid derivative.

The range of applicability of microencapsulation processes is also extremely wide. Thus, if the amine and/or ascorbic acid derivative is a solid, incorporation into a matrix of the coating material is appropriate. If the amine and/or ascorbic acid derivative is an organic liquid, liquid-jet methods for the production of particles larger than a few hundred micrometers may be employed. If smaller particles are needed, coacervation techniques or interfacial polymerization may be utilized. If the amine and/or ascorbic acid derivative forms a stable emulsion in a polymer solution or a meltable medium, solidified particles of this emulsion may be prepared.

Methods suitable for the encapsulation of hydrophobic amines and/or ascorbic acid derivative are known in the art, and described for example in U.S. Pat. No. 4,808,639 and U.S. Patent Application Publication No. 2004/0014860, each of which is incorporated by reference in its entirety.

Suitable encapsulating or wall-forming materials include, but are not limited to, dextrin, gelatin, gum arabic, casein, paraffin wax, natural waxes such as carnauba wax, beeswax, candelilla wax and Japan wax, acrylic resin, styrene-maleic acid, polyamide, polyethylene, poly(urea-formaldehyde), polyethylene-ethyl cellulose mixtures, polyurethanes, polyesters, acetal homopolymers and copolymers, epoxy resins, cellulose acetophthalate and polypropylene. Any suitable wall material may be used provided the microcapsules formed therefrom are inert with respect to the action of both the entrapped amine and/or ascorbic acid derivative as well as the curable mixture. In addition, the microcapsules should be impermeable to both the curable mixture and the amine and/or ascorbic acid derivative to prevent premature release of one into the other thereby prematurely and undesirably initiating the curing process. In certain embodiments, the microcapsules can be formed from poly(urea-formaldehyde).

The diameter of the microcapsules may, for example range from about 5 to about 1,000 microns, although the average particle size will generally be between 500 and 200 microns or less. The microcapsule shell should be sufficiently thick to maintain the curable mixture and the amine and/or ascorbic acid derivative separate over a prolonged period of time and sufficiently thin to allow the microcapsules to rupture upon the application of pressure, abrasive action or other physical manipulation for release of the amine and/or ascorbic acid derivative. The microcapsule shells should also be sufficiently thick to withstand the physical manipulation occurring during mixing and application of the adhesive composition to a substrate. Depending on the material selected, the shell thickness of from about 1 to about 100 nm (e.g., from 1 nm to 60 nm) can be sufficient.

For ease of preparation of the adhesive composition and to achieve an even distribution of the microcapsules therethroughout, the density of the curable mixture should be substantially equal to the density of the microcapsules. Substantial equal densities of the microcapsules and the surrounding curable mixture will assist in evenly distributing the microcapsules throughout the curable mixture and substantially prevent accidental rupture of the microcapsule during preparation of the composition.

In some cases, the composition can substantially free of water. For example, the composition can include less than 0.5% by weight (e.g., less than 0.1% by weight, less than 0.05% by weight, or less than 0.01% by weight) water, based on the total weight of the composition. In other embodiments, the composition can include water In some embodiments, the composition can be packaged in a sealed container. When packaged in the sealed container, the adhesive composition remains uncured for a period of at least 90 days (e.g., at least 180 days, or at least 1 year).

Upon an applied stimulus, such as the application of pressure, abrasive action, other physical manipulation, or heating to a temperature of from 25° C. to 40° C., the composition can cure within 2 hours or less (e.g., 1 hour or less, 30 minutes or less, 15 minutes or less, 10 minutes or less, 5 minutes or less, 2 minutes or less, or 1 minute or less).

In other embodiments, the adhesive composition can be formulated such that the presence of ambient moisture (water) can trigger the polymerization/curing of the adhesive (e.g., the (meth)acrylate/polyurethane hybrid adhesive). These compositions can include a water-activated initiating system. The water-activated initiating system can comprise a peroxide and an ascorbic acid derivative (ascorbic acid protected with water-sensitive protecting groups that are removed in the presence of trace water moisture).

The polymerization of ethylenically unsaturated monomers, such as (meth)acrylate monomers, can be efficiently initiated with a catalyst composed of ascorbic acid and a peroxide. In these systems, the peroxide oxidizes the ascorbic acid, which then serves to initiate a radical polymerization of the monomers. Protecting the hydroxyl groups at C-2 and C-3 of ascorbic acid (e.g., using an electron-withdrawing group such as an acyl group) prevents oxidation by the peroxide, thus preventing the curing reaction from proceeding. The presence of small amounts of water, in the form of added water or atmospheric moisture, can hydrolyze these protecting groups regenerating the ascorbic acid, thus inducing the curing process. Protection of the hydroxyl groups at C-5 and C-6 of ascorbic acid can modulate the solubility/dispersibility of the ascorbic acid derivative in the adhesive composition.

By way of example, the water-activated initiating system can comprise (R)-2-((S)-2,2-dimethyl-1,3-dioxolan-4-yl)-5-oxo-2,5-dihydrofuran-3,4-diyl bis(2,2,2-trifluoroacetate) (an ascorbic acid derivative) in combination with tert-butylperoxybenzoate. This system can be used to provide adhesive compositions that are stable until water is added or the mixture is exposed to the ambient atmosphere, but cure within 1 minute upon exposure to water. This system can be used to formulate single-component adhesive compositions in contrast to current two-component system systems in which the initiators must be segregated.

In some embodiments, the adhesive composition can be formulated such that the presence of ambient moisture (water) can trigger the polymerization/curing of (meth)acrylate/polyurethane hybrid adhesive. These compositions can include a water-activated initiating system. The water-activated initiating system can comprise a peroxide and an ascorbic acid derivative (ascorbic acid protected with water-sensitive protecting groups that are removed in the presence of trace water moisture).

(Meth)acrylate polymerization can be efficiently initiated with a catalyst composed of ascorbic acid and a peroxide. In these systems, the peroxide oxidizes the ascorbic acid, which then serves to initiate a radical polymerization of the (meth)acrylate monomers. Protecting the hydroxyl groups at C-2 and C-3 of ascorbic acid (e.g., using an electron-withdrawing acyl group) prevents oxidation by the peroxide, thus preventing the curing reaction from proceeding. The presence of small amounts of water, in the form of added water or atmospheric moisture, can hydrolyze these protecting groups regenerating the ascorbic acid, thus inducing the curing process. Protection of the hydroxyl groups at C-5 and C-6 of ascorbic acid can modulate the solubility/dispersibility of the ascorbic acid derivative in the adhesive composition.

Accordingly, provided herein are single-component adhesive compositions that comprise a curable mixture comprising a urethane di(meth)acrylate, and a water-activated initiating system. The water-activated initiating system can comprise a peroxide and an ascorbic acid derivative defined by Formula I below

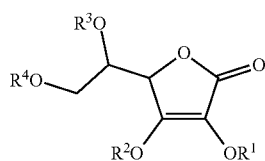

Formula I wherein

R[1] and R[2] are each independently selected from hydrogen, alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, —SiR[5]R[6]R[7], alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from R[8], with the proviso that at least one of R[1] and R[2] is not hydrogen;

R[3] and R[4] are each independently selected from hydrogen, alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, and alkylheteroaryl, each optionally substituted with one or more substituents individually selected from R[8]; or R[3] and R[4], together with the atoms to which they are attached, form a 5-7 membered heterocyclic ring optionally substituted with one or more substituents individually selected from R[8];

R[5], R[6], and R[7] are each independently selected from alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, and alkylheteroaryl, each optionally substituted with one or more substituents individually selected from R[8]; and R[8] is, independently for each occurrence, selected from hydroxy, halogen, —CN, —NO$_2$, —SF$_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkyl sulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl.

In some embodiments, R[1] and R[2], together with the oxygen atoms to which they are attached, are electron withdrawing moieties. In some embodiments, R[1] and R[2] are each protecting groups that can be readily cleaved in the presence of water.

In some embodiments, R[1] and R[2] are each independently selected from alkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, —SiR[5]R[6]R[7], alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from R$_8$.

In some embodiments, R[1] and R[2] are each independently selected from —SiR[5]R[6]R[7], alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from R$_8$.

In some cases, R[1] and R[2] are each independently $C_1$-$C_4$ alkylcarbonyl or $C_1$-$C_4$ haloalkylcarbonyl. For example, R[1] and R[2] can be —C(=O)—CH$_3$ or —C(=O)—CF3.

In some cases, R[1] and R[2] are each independently trialkylsilyl or trihaloalkylsilyl. For example, R[1] and R[2] can be —Si(CH$_3$)$_3$.

In some cases, R[4] can be $C_1$-$C_{18}$ alkylcarbonyl. In some cases, R[3] and R[4] are each independently $C_1$-$C_4$ alkylcarbonyl or $C_1$-$C_4$ haloalkylcarbonyl.

In some cases, R[3] and R[4] are each independently trialkylsilyl or trihaloalkylsilyl.

In some cases, R[3], R[4], or a combination thereof include an ethylenically unsaturated moiety, such as an acrylate moiety, a methacrylate moiety, or a vinyl moiety.

In some embodiments, the ascorbic acid derivative can be one of the compounds shown below.

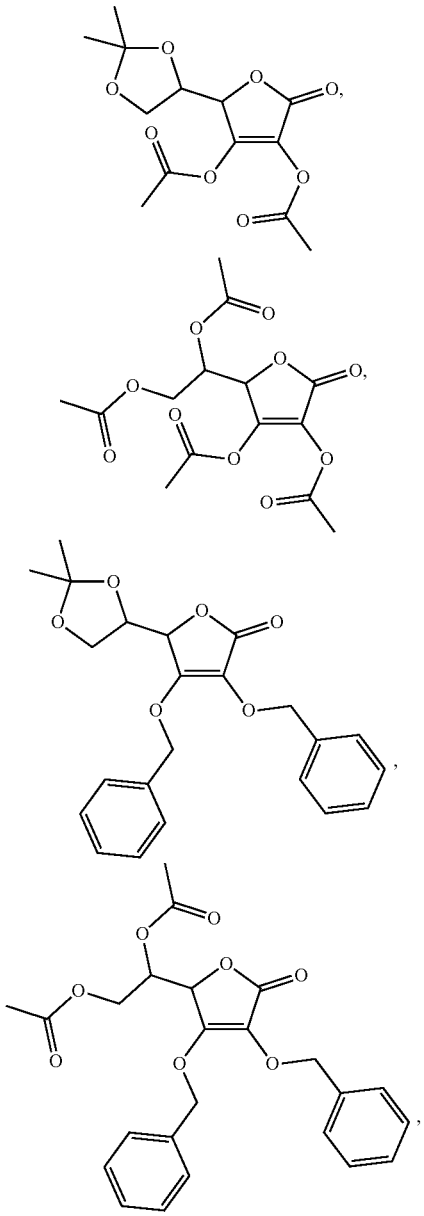

-continued

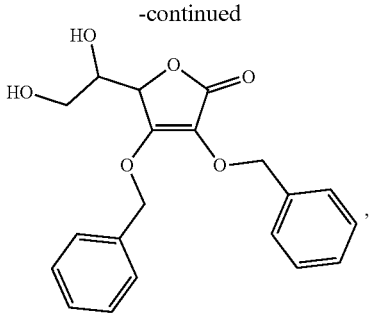

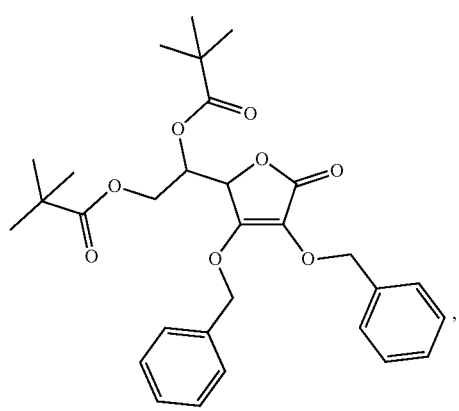

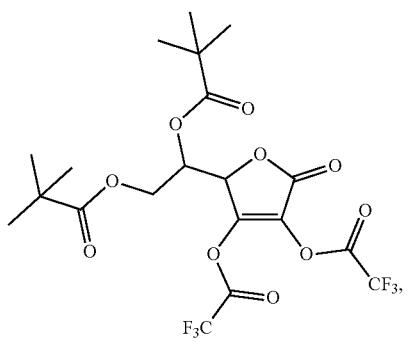

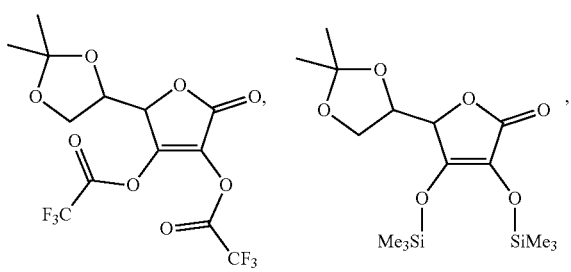

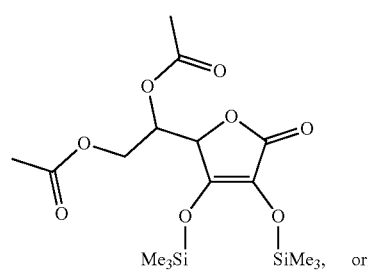, or

-continued

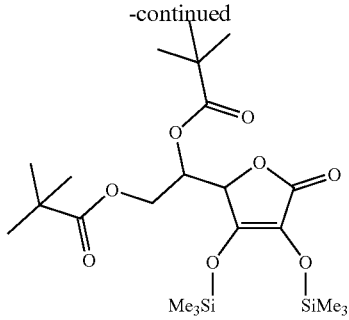

The ascorbic acid derivative can comprise from 0.5% to 5% by weight (e.g., from 1% to 5% by weight, or from 3% to 5% by weight) of the adhesive composition, based on the total weight of the adhesive composition.

In embodiments where the water-activated initiating system is included, the composition can substantially free of water. For example, the composition can include less than 0.5% by weight (e.g., less than 0.1% by weight, less than 0.05% by weight, or less than 0.01% by weight) water, based on the total weight of the composition.

In embodiments where the water-activated initiating system is included, the composition can be packaged in a sealed container such that the composition protected from atmospheric moisture. When packaged in the sealed container, the adhesive composition remains uncured for a period of at least 90 days (e.g., at least 180 days, or at least 1 year).

Upon exposure to air having a relative humidity of at least 30% (e.g., at least 40%, at least 50%, or at least 60%), the adhesive composition can cure. In some embodiments, when exposed to air having a relative humidity of at least 30% (e.g., at least 40%, at least 50%, or at least 60%), the composition cures within 2 hours or less (e.g., 1 hour or less, 30 minutes or less, 15 minutes or less, 10 minutes or less, 5 minutes or less, 2 minutes or less, or 1 minute or less).

Curable Mixtures

The adhesive compositions described above can include a curable mixture that comprises one or more ethylenically unsaturated monomers.

Such monomers can be any ethylenically unsaturated monomer that can be polymerized by a free-radical mechanism. Suitable examples of these include, but are not limited to, (meth)acrylates, hydroxyl-containing (meth)acrylates, vinyl aromatics, vinyl halides, vinylidene halides, esters of vinyl alcohol and $C_1$-$C_{18}$ monocarboxylic acids, esters of allyl alcohol and $C_1$-$C_{18}$ monocarboxylic acids, ethylenically unsaturated monomers containing at least one carboxylic acid group, salts of ethylenically unsaturated monomers containing at least one carboxylic acid group, anhydrides of ethylenically unsaturated dicarboxylic acids, nitrites of ethylenically unsaturated carboxylic acids, ethylenically unsaturated monomers containing at least one sulfonic acid group, salts of ethylenically unsaturated monomers containing at least one sulfonic acid group, ethylenically unsaturated monomers containing at least one phosphorous atom, ethylenically unsaturated monomers containing at least one amide group, dienes, alkyds, nitrogen-containing adhesion monomers, glycidyl esters of ethylenically unsaturated monomers, vinyl esters of the formula $CH_2$=CH—O—(CO)—C—$(R_{100})_3$ wherein $R_{100}$ is an alkyl (sold under the trade name VEOVA™ by Shell), alkylaminoalkyl group-containing (meth)acrylic monomers, alkyl esters of (meth) acrylic acid containing an ether bond in the alkyl, urethane esters of (meth)acrylic acid, urea esters of (meth)acrylic acid, vinyl monomers, isocyanate esters of (meth)acrylic acid, carbonyl containing monomers, monomers containing hydrolyzable Si-organic bonds, vinyl esters of neo acids (such as those sold under the trade name EXXAR™ NEO 10 and NEO 12 from Exxon), enamines, alkyl crotonates, phosphate (meth)acrylates, and (meth)acryloxy benzophenones.

In some embodiments, the ethylenically unsaturated monomer can comprise a (meth)acrylate monomer.

In some embodiments, the ethylenically unsaturated monomer can comprise a bifunctional monomer (e.g., a bifunctional urethane monomer). In certain embodiments, the bifunctional urethane monomer can comprise a urethane di(meth)acrylate. The urethane di(meth)acrylate can be any suitable urethane polymer or oligomer which is functionalized by two (meth)acrylate moieties. In some embodiments, the urethane di(meth)acrylate can comprise a urethane chain (e.g., a urethane polymer or oligomer) appended by two terminal (meth)acrylate groups.

Urethane (meth)acrylates can undergo rapid curing/polymerization via the (meth)acrylate moieties while the urethane linkage provides adhesive properties similar to those of polyurethane-based adhesives. Further, the urethane linker promotes water sorption, helpful to initiate curing of compositions that include a water-activated initiator, and can participate in interchain hydrogen bonding to strengthen the composite structure of the cured adhesive. Urethane (meth)acrylates can be mixed with other ethylenically unsaturated monomers as discussed below, such as methyl methacrylate or ethylene dimethacrylate, to optimize the viscosity and performance of the final adhesive product.

In some embodiments, the urethane di(meth)acrylate can be defined by the formula below

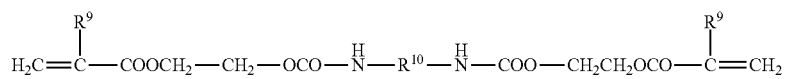

wherein $R^9$ is hydrogen or methyl; and $R^{10}$ is selected from alkylene, haloalkylene, heteroalkylene, haloheteroalkylene, cycloalkylene, alkylcycloalkylene, cycloalkylalkylene, heterocyclylene, alkylheterocyclylene, heterocyclylalkylene, arylene, alkylarylene, or alkylarylalkylene, each optionally substituted with one or more substituents individually selected from $R^8$.

In certain embodiments, the urethane di(meth)acrylate is defined by the formula below

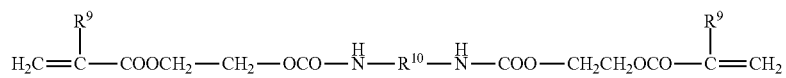

wherein $R^9$ is hydrogen or methyl; and $R^{10}$ is an alkylene group (e.g., a $C_1$-$C_{12}$ alkylene group) optionally substituted with one or more substituents individually selected from $R^8$.

In certain embodiments, $R^{10}$ can be the alkylene group below

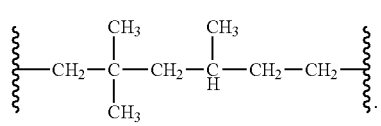

In some embodiments, the urethane di(meth)acrylate comprises from 30% to 70% by weight (e.g., from 40% to 60% by weight) of the adhesive composition, based on the total weight of the adhesive composition.

Optionally, the curable mixture can further include one or more additional copolymerizable multi-functional (meth)acrylate components, such as difunctional hydrophilic (water dispersible) ethoxylated Bisphenol A di(meth)acrylates, preferably having about 10 to about 30 ethoxy groups, ethoxylated tetrabromo bisphenol A diacrylates, preferably having about 10 to about 30 ethoxy groups, polyethylene glycol di(meth)acrylates, preferably having about 200 to 600 ethylene glycol groups, metallic di(meth)acrylates, highly propoxylated glyceryl tri(meth)acrylates, preferably having about 10 to about 30 propoxy groups, trifunctional monomers of pentaerythritol tri(meth)acrylate, tetrafunctional monomers of pentaerythritol tetra(meth)acrylate, pentafunctional monomers of pentaerythritol penta(meth)acrylate, pentaerythritol dimethacrylate (PEDM), dipentaerythritol penta(meth)acrylate (DPEPA), trimethylolpropane tri(meth)acrylate (TMPTMA), ethoxylated trimethylolpropane tri(meth)acrylates, preferably having about 10 to about 30 ethoxy groups, di-trimethylolpropane tetraacrylate, tris(2-hydroxyethyl) isocyanurate, glycerol di(meth)acrylate, triethylene glycol dimethacrylate (TEGDMA), the diglycidyl (meth)acrylate adduct of Bisphenol A (Bis-GMA), or a combination thereof.

In some embodiments, the curable mixture can further comprise an alkyleneoxy di(meth)acrylate (e.g., a PEG di(meth)acrylate or a PPO di(meth)acrylate). In certain examples, the alkyleneoxy di(meth)acrylate can have a molecular weight of from 250 Da to 1,000 Da.

In some examples, the alkyleneoxy di(meth)acrylate can be defined by the formula below

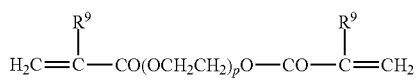

wherein $R^9$ is hydrogen or methyl; and p is an integer from 1 to 40.

In some embodiments, the alkyleneoxy di(meth)acrylate can comprise from 10% to 40% by weight (e.g., from 15% to 30% by weight) of the adhesive composition, based on the total weight of the adhesive composition.

Optionally, the curable mixture can further include one or more additional ethylenically unsaturated components. For example, the curable mixture can further one or more monofunctional (meth)acrylates. These (meth)acrylates can be reaction products of ethylenically unsaturated carboxylic acids and $C_1$-$C_{18}$ alcohols. Examples of such (meth)acrylates include, but are not limited to, methyl (meth)acrylate, ethyl (meth)acrylate, propyl (meth)acrylate, n-butyl (meth) acrylate, isobutyl (meth)acrylate, t-butyl (meth)acrylate, pentyl (meth)acrylate, hexyl (meth)acrylate, cyclohexyl (meth)acrylate, benzyl (meth)acrylate, 2-ethylhexyl (meth) acrylate, heptyl (meth)acrylate, n-octyl (meth)acrylate, nonyl (meth)acrylate, decyl (meth)acrylate, undecyl (meth) acrylate, dodecyl (meth)acrylate, tridecyl (meth)acrylate, lauryl (meth)acrylate, stearyl (meth)acrylate, isobornyl (meth)acrylate, norbornyl (meth)acrylate, 4-tertbutylcyclohexyl (meth)acrylate, 3,3,5-trimethylcyclohexyl (meth) acrylate, dimethyl maleate, n-butyl maleate, t-butylaminoethyl (meth)acrylate, 2-t-butylaminoethyl (meth)acrylate, glyceryl (meth)acrylate, and N,N-dimethylaminoethyl (meth)acrylate.

Functional ethylenically unsaturated monomers can also be included, including ethylenically unsaturated monomers containing at least one carboxylic acid group, ethylenically unsaturated monomers containing at least one hydroxy group, ethylenically unsaturated monomers containing at least one amine, ethylenically unsaturated monomers containing at least one amide, ethylenically unsaturated monomers containing at least one sulfonic acid group, Examples of ethylenically unsaturated monomers containing at least one carboxylic acid group include, but are not limited to, (meth)acrylic acid, maleic acid, fumaric acid, itaconic acid, ethacrylic acid, crotonic acid, citraconic acid, cinnamic acid, phthalic acid, isophthalic acid, terephthalic acid, tetrahydrophthalic acid, hexahydrophthalic acid, tetrabromophthalic acid, trimellitic acid, pyromellitic acid, 1,4,5,6,7,7-hexachloro-5-norbornene-2,3-dicarboxylic acid, succinic acid, 2,6-naphthalenedicarboxylic acid, glutaric acid, sebacic acid, azelaic acid, 1,4-cyclohexanedicarboxylic acid, and 1,3-cyclohexanedicarbocylic acid.

Examples of anhydrides of ethylenically unsaturated dicarboxylic acids include, but are not limited to, maleic anhydride, succinic anhydride, phthalic anhydride, tetrahydrophthalic anhydride, hexahydrophthalic anhydride, tetrabromophthalic anhydride, trimellitic anhydride, pyromellitic anhydride, and 1,4,5,6,7,7-hexachloro-5-norbornene-2,3-dicarboxylic anhydride.

Examples of esters of ethylenically unsaturated monomers containing at least one carboxylic acid group include, but are not limited to, methylhydrogen fumarate, benzyl hydrogen maleate, butyl hydrogen maleate, octyl hydrogen itaconate, dodecyl hydrogen citraconate, butyl fumarate, octyl fumarate, octyl maleate, dibutyl maleate, and dioctyl maleate.

Examples of esters of vinyl alcohol and $C_1$-$C_{18}$ monocarboxylic acids include, but are not limited to, vinyl acetate, vinyl acetoacetate, t-butylacetoacetate, ethylacetoacetate, vinyl propionate, vinyl n-butyrate, vinyl heptanoate, vinyl perlogonate, vinyl 3,6-dioxaheptanoate, vinyl 3,6,9-trioxanundecanote, vinyl laurate, and vinyl stearate. Examples of esters of allyl alcohol and $C_1$-$C_{18}$ monocarboxylic acids include, but are not limited to, allyl acetate, allyl propionate, allyl (meth)acrylate, allyl n-butyrate, allyl laurate, allyl stearate, diallyl maleate, and diallyl fumarate.

Examples of suitable nitriles of ethylenically unsaturated carboxylic acids include, but are not limited to, acrylonitrile and methacrylonitrile. Examples of vinyl aromatics include, but are not limited to, styrene, α-methyl styrene, o-chlorostyrene, chloromethyl styrene, α-phenyl styrene, styrene sulfonic acid, salts of styrene sulfonic acid, para-acetoxystyrene, divinylbenzene, diallyl phthalate, vinyl toluene, and vinyl naphthalene. Examples of dienes include, but are not limited to, butadiene, isoprene, and chloroprene.

Examples of unsaturated monomers having both olefinic unsaturation and terminal —$SO_3$ groups, such as an —$SO_3H$ group, include vinyl sulfonic acid, arylsulfonic acid, acryloyloxybenzenesulfonic acid, (meth)acryloyloxynaphthalenesulfonic acid, 2-acrylamido-2-methylpropanesulfonic acid, 2-acrylamido-2-methyl-propanesulfonic acid (AMPS), 2-sulfoethyl methacrylate (SEM) and its derivatives, 2-sulfopropyl (meth)acrylate, 4-sulfobutyl (meth)acrylate, 3-sulfobutyl (meth)acrylate, 3-bromo-2-sulfopropyl (meth) acrylate, 3-methoxy-1-sulfo-propyl (meth)acrylate, 1,1-dimethyl-2-sulfoethyl (meth)acrylamide, 3-sulfopropyl methacrylate (SPM), and active derivatives (esters and salts) of the foregoing. A combination comprising at least one of the foregoing acids, esters, or salts may also be used. Examples of derivatives include sulfonic acid salts of AMPS, SEM, and SPM, and hydrolytically active esters of AMPS, SEM, and SPM. AMPS compounds are available from Lubrizol Corporation, Wickliffe, Ohio. SEM and SPM compounds are available from Polyscience, Inc., Pa.

Examples of unsaturated monomers containing at least one amide group include, but are not limited to, (meth) acrylamide, dimethyl (meth)acrylamide, N-alkyl (meth) acrylamide, N-butylacrylamide, tetramethylbutylacrylamide, N-alkylol (meth)acrylamide, N-methylol (meth) acrylamide, N-octyl acrylamide, methylene bis acrylamide, diacetoneacrylamide, ethyl imidazolidon (meth)acrylate, and N,N-dimethylaminopropylmethacrylamide.

Examples of hydroxyl containing (meth)acrylates include, but are not limited to, 2-hydroxyethyl (meth)acrylate, hydroxypropyl (meth)acrylates, hydroxypropylmethacrylates, and hydroxybutyl (meth)acrylates.

In some embodiments, the curable mixture can include a copolymerizable adhesion promoter. In some cases, the copolymerizable adhesion promoter can comprise an ethylenically unsaturated monomer containing at least one phosphorous atom. Examples of copolymerizable adhesion promoters include but are not limited to N-tolyglycine-N-glycerol methacrylate, pyromellitic acid dimethacrylate (PMDM), dipentaerythritol-pentaacrylate-phosphoric acid ester (PENTA), bis(2-ethylhexyl)hydrogen phosphate, 2-(methacryloyloxy)-ethyl phosphate, a butane tetracarboxylic acid-bis-hydroxyethylmethacrylate (TCB resin), methacrylic acid, maleic acid, p-vinylbenzoic acid, 11-methacryloyloxy-1,1-undecanedicarboxylic acid, 1,4-dimethacryloyloxyethylpyromellitic acid, 6-methacryloyloxyethylnaphthalene-1,2,6-tricarboxylic acid, 4-methacryloyloxymethyltrimellitic acid and the anhydride thereof, 4-methacryloyloxyethyltrimellitic acid ("4-MET") and an anhydride thereof ("4-META"), 4-(2-hydroxy-3-methacryloyloxy) butyltrimellitic acid and an anhydride thereof, 2,3-bis(3,4-dicarboxybenzoyloxy)propyl methacrylate, methacryloyloxytyrosine, N-methacryloyloxyphenylalanine, methacryloyl-p-aminobenzoic acid, an adduct of 2-hydroxyethyl methacrylate with pyromellitic dianhydride (PMDM), an adduct of 2-hydroxyethyl methacrylate with 3,3',4,4'-benzophenonetetracarboxylic dianhydride (BTDA) or 3,3',4,4'-biphenyltetracarboxylic dianhydride, BPDM, which is the reaction product of an aromatic dianhydride with an excess of 2-HEMA (2-hydroxyethyl methacrylate), the reaction product of 2-HEMA with ethylene glycol bistrimellitate dianhydride (EDMT), the reaction product of 3,3',4,4'-diphenylsulfone tetracarboxylic dianhydride and 2-HEMA (DSDM), the adduct of pyromellitic dianhydride with glycerol dimethacrylate (PMGDM), 2-(methacryloyloxy)alkyl phosphates such as 2-(methacryloyloxy)ethyl phosphate, or a combination comprising at least one of the foregoing adhesion promoters. Examples of copolymerizable nitrogen-containing adhesion promoters include, but are not limited to, ureido (meth)acrylates, (meth)acrylates with at least one of urea and thiourea in the side chains, acrylic allophanes, aminoethyl acrylate and methacrylate, dimethylaminoethyl acrylate and methacrylate, diethylaminoethyl acrylate and methacrylate, dimethylaminopropyl acrylate and methacrylate, 3-dimethylamino-2,2-dimethylpropyl acrylate and methacrylate, 2-N-morpholinoethyl acrylate and methacrylate, 2-N-piperidinoethyl acrylate and methacrylate, N-(3-dimethylaminopropyl)acrylamide and -methacrylamide, N-dimethylaminoethylacrylamide and -methacrylamide, N-diethylaminoethylacrylamide and -methacrylamide, N-(4-morpholinomethyl)acrylamide and -methacrylamide, vinylimidazole and also monoethylenically unsaturated derivatives of ethyleneurea, such as N-(2-(meth)acryloyloxyethyl)ethyleneurea, N-(β-acrylamidoethyl)ethyleneurea, N-2-(allylcarbamato)aminoethylimidazolidinone, N-vinylethyleneurea, N-(3-allyloxy-2-hydroxypropyl)aminoethylethyleneurea, N-vinyloxyethyleneurea, N-methacryloyloxyacetoxyethylethyleneurea, N-(acrylamidoethylene) ethyleneurea, N-(methacrylamidoethylene)-ethyleneurea, 1-(2-methacryloyloxyethyl)imidazolin-2-one, N-(methacrylamidoethyl)ethyleneurea, and combinations thereof.

In certain embodiments, the curable mixture can be free of acidic and basic monomers.

Oxidants

The adhesive compositions described herein further include one or more oxidants, such as one or more peroxides. Examples of useful peroxides include diacyl peroxides, dialkyl peroxides, alkyl peroxides, peroxyesters, perketales, peroxy dicarbonates, ketone peroxides or alkyl hydroxy peroxides.

By way of example, the peroxide can comprise benzoyl peroxide, decanoyl peroxide; lauroyl peroxide; benzoyl peroxide, di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy) hexane, t-amyl peroxy-2-ethyl-hexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexane-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate and ethyl 3,3-di-(t-amylperoxy)-butyrate, and combination thereof.

In some embodiments, the peroxide can be selected from the group consisting of benzoyl peroxide, t-butylperoxymaleic acid, tert-butylperoxybenzoate, 2,5-dimethyl-2,5-bis(benzoylperoxy)hexane, t-butyl perbenzoate, cumene hydroperoxide, t-butyl hydroperoxide, tert-butylamyl peroxide, di-(tert-butyl) peroxide, tert-butylperoxy-(3,5,5-trimethylhexanoate), tert-butylperoxy-2-ethylhexylcarbonate, and combinations thereof The oxidant (e.g., the peroxide) can comprise from 0.5% to 5% by weight of the adhesive composition, based on the total weight of the adhesive composition.

Other Components

Optionally, the adhesive compositions can further include one or more conventional additives, such as plasticizers, stabilizers, antioxidants, dyes, light stabilizers, fillers, drying agents, surface-active additives, anti-foaming agents, dye pigments, fragrances, preservatives, and combinations thereof.

In certain embodiments, the adhesive compositions described herein can further include a filler. Suitable fillers include silicate-containing minerals, such as antigorite, serpentine, hornblends, amphibiles, chrysotile, talc, mica, and kieselguhr; metal oxides such as kaolin, aluminum oxides, titanium oxides, and iron oxides; metal salts such as chalk and heavy spar (barium sulfate); inorganic pigments such as cadmium sulfide and zinc sulfide; and glass, asbestos powder, carbon fibers, and the like. In some embodiments, the filler can comprise an inorganic fillers, such as $La_2O_3$, $ZrO_2$, $BiPO_4$, $CaWO_4$, $BaWO_4$, $SrF_2$, $Bi_2O_3$, or a glass (e.g., sodium-lime glass, lithium and aluminosilicates, borosilicates, etc.). In some embodiments, the filler can comprise an organic filers, such as polymer granulate. In some embodiments, the filler can comprise from 10% to 40% by weight of the adhesive composition, based on the total weight of the adhesive composition.

Methods of Making and Using

The adhesive composition described herein may be formulated by blending the components together using means well-known in the art. Generally, the components are blended in a suitable mixer. Such blending is preferably conducted in an inert atmosphere in the absence of oxygen and atmospheric moisture to prevent premature reaction. Once the adhesive composition is formulated, it is packaged in a suitable container such that it is protected from atmospheric moisture and oxygen. In the case of moisture-curable compositions, this packaging can prevent premature deprotection of the ascorbic acid derivative and curing of the adhesive composition prior to application of the adhesive (and contact with atmospheric moisture). Suitable packages and containers include, for example, caulking tubes (made, for example, of paper, metal, or plastic), screw-capped squeezable tubes, syringes, cans, drums, and the like.

The adhesive compositions described herein can be used to bond porous and nonporous substrates together. The adhesive compositions can be applied to a substrate and the adhesive on the first substrate is thereafter contacted with a second substrate. In preferred embodiments, the surfaces to which the adhesive is applied are cleaned and primed prior to application, see for example U.S. Pat. Nos. 4,525,511, 3,707,521 and 3,779,794, relevant parts of all are incorporated herein by reference. Generally the adhesives are applied at ambient temperature in the presence of atmospheric moisture. In the case of compositions that include a water-activated initiating system, exposure to water, e.g., water vapor or moisture can initiate cure of the adhesive. Ordinary ambient humidity (e.g., 30% relative humidity, 40% relative humidity, 50% relative humidity, or 60% relative humidity) is usually adequate to promote cure. Heat or high humidity will accelerate cure, and low temperatures (e.g. 5° C. or less) or low humidity (e.g., 15% R.H. or less) will retard cure. Bonds to damp substrates (e.g., wood) typically cure faster than bonds to dry substrates (e.g., glass). In the case of adhesives that employ stimuli-responsive initiating systems (i.e., encapsulated amines), a physical stimulus (e.g., application of pressure, abrasive action or other physical manipulation of the adhesive) and/or mild heat will initiate polymerization/curing of the adhesive.

The compositions described herein can be employed in any application where an adhesive, coating, or sealant is desired. The compositions can be applied to a variety of articles and substrates, such as articles or substrates of glass, metal, plastic, wood, leather, masonry, textiles, and the like.

By way of non-limiting illustration, examples of certain embodiments of the present disclosure are given below.

EXAMPLES

Example 1: Development of Non-Foaming, High Strength, Single Component Methacrylate/Polyurethane Adhesives This example relates to a single-component methacrylate/polyurethane hybrid adhesives, including single-component moisture-cured methacrylate/polyurethane hybrid adhesives and single-component physically-activated methacrylate/polyurethane hybrid adhesives. These methacrylate/polyurethane hybrid adhesives can combine the non-toxic, high strength properties of traditional methacrylate adhesives with the bonding characteristics of polyurethanes. Moisture-cured and physically activated methacrylates have the potential to be a disruptive technology in consumer adhesives. Despite the utility of methacrylate adhesive chemistry, applications have been limited to industrial and biomedical issues. This is due to the curing mechanism, which is initiated by either heat, light, or mixing a two-component redox system. This example describes a single-component methacrylate adhesive system, in which the polymerization/curing reaction is triggered by ambient moisture and/or physical contact of surfaces. This eliminates the need for mixing or an external energy stimulus to initiate curing. Using this strategy, the benefits of polyurethane adhesive chemistry can be brought to the consumer market, in a system that is readily usable by the average individual.

Overview

In this example, single-component methacrylate/polyurethane hybrid adhesives are described in which ambient moisture (water) triggers the polymerization/curing of the methacrylate/polyurethane hybrid adhesives, allowing for rapid curing without generating significant by-products (e.g., that may adversely impact adhesive strength).

Water Triggered Initiation. Water triggered initiation of polymerization/curing can be achieved through protection of an initiator and/or accelerator with water sensitive protecting group(s). The water sensitive protecting group(s) can be removed in the presence of trace water moisture. Once deprotected, the polymerization/curing of the methacrylate/polyurethane hybrid adhesive can be efficiently initiated by a catalyst system that includes, for example, the (now deprotected) accelerator and an oxidant (e.g., a peroxide).

By way of example, water triggered initiation of polymerization/curing can be achieved through protection of ascorbic acid (an accelerator) with water sensitive protecting group(s). In this system, upon exposure to water, the peroxide oxidizes the (now deprotected) ascorbic acid, which then serves to initiate the radical polymerization of the methacrylate monomers. Protecting the hydroxyl groups at C-2 and C-3 of the ascorbic acid with electron-withdrawing acyl groups prevents oxidation by the peroxide prior to water-induced deprotection, thus preventing the curing reaction. The presence of small amounts of water in the form of added water (e.g., a dampened surface and/or atmospheric water) hydrolyzes these protecting groups to form the ascorbic acid, which induces the curing process. An example catalyst system can include (R)-2-((S)-2,2-dimethyl-1,3-dioxolan-4-yl)-5-oxo-2,5-dihydrofuran-3,4-diyl-bis(2,2,2-trifluoroacetate) as an accelerator and tert-butylperoxybenzoate as an oxidant. This catalyst system is stable until water is added or the mixture is exposed to the ambient atmosphere, but it can induce polymerization/curing within minutes (e.g., within 60 seconds) upon exposure to water. This catalyst system can be used to formulate single-component adhesives in contrast to current consumer formulations which are two-component systems (one part containing monomer and a second part containing initiator(s)) which react upon mixing.

Water triggered initiation of polymerization/curing can also be achieved through other water-activated catalyst systems. For example, amines can also be used as accelerators in combination with a peroxide oxidant. The amines can similarly be protected with a water sensitive protecting group. As with the ascorbic acid example above, the water sensitive protecting group can be removed in the presence of trace water moisture. Once deprotected, the polymerization/curing of the methacrylate/polyurethane hybrid adhesive can be efficiently initiated by a catalyst system that includes the (now deprotected) amine and a peroxide.

Microencapsulation to Produce Physically-Activated Adhesives. Physical activation of polymerization/curing can be achieved through encapsulation of an initiator and/or accelerator with a microcapsule. By way of example, amines (e.g., large, hydrophobic amines) can be encapsulated within microcapsules to produce a stable, one-component adhesive. Encapsulation physically sequesters the amine from the peroxide (e.g., tert-butylperoxybenzoate) in the adhesive formulation, thereby preventing the reaction that initiates curing/polymerization. The curing/polymerization commences when the microcapsules are physically crushed between surfaces that are being glued. The crushing process releases the amine, which then reacts with the peroxide in the mixture resulting in curing of the adhesive.

Polyurethane-Methacrylate Hybrid Adhesives. Urethane dimethacrylates can be used as monomers in the adhesive system. Urethane dimethacrylates include a polyurethane chain appended with two terminal methacrylate groups. The methacrylate groups participate in the polymerization/curing reaction while the urethane linkage provides adhesive properties similar to those of polyurethane adhesives. The polyurethane chain also promotes water sorption, which can be used to trigger polymerization/curing, as well as interchain hydrogen bonding that strengthens the composite structure of the adhesive. Additional (meth)acrylate monomers, such as methyl (meth)acrylate of ethylene di(meth)acrylate, can be incorporated in the adhesive mixture to optimize the properties of the adhesive mixture and/or the properties of the cured adhesive (e.g., viscosity, adhesive strength, etc.).

Protected Amines for Use in Water Triggered Initiation

Catalyst systems were investigated that include a protected aliphatic amine that can become active following deprotection in the presence of water. A primary aliphatic amine was protected with a water labile, deactivating protecting group, such as a silane and/or a trifluoroacetate moiety. While aliphatic amines are used to initiate curing in dental adhesives, such compositions generally include tertiary amines, not primary amines. Primary amines tend not to be reactive enough to initiate the methacrylate polymerization within a desirable period of time time. The proposed primary aliphatic amine, 2,4,6-trimethylaniline, can initiate polymerization more rapidly due to the additional radical stabilizing 2 and 6 methyl groups.

TABLE 1

Amine compounds examined as initiators in UDMA:MMA (70:30) in the presence of a peroxide.

| Amine (62 mM) | Dicumyl Peroxide Cure Time (69 mM) | Benzoyl Peroxide Cure Time (69 mM) |
|---|---|---|
| Aniline (PhNH₂) | N/A | N/A |
| N-methyl aniline | N/A | 30 min |
| 4-methyl aniline | N/A | N/A |
| 2,4,6-trimethyl aniline | N/A | 15 min |
| Propargylamine (H₂N-CH₂-C≡CH) | N/A | N/A |
| 3-amino-1-propanol | N/A | N/A |
| Diphenylamine | N/A | N/A |
| Triethylamine | N/A | 60 min |
| N,N-Bis(2-hydroxyethyl)-p-toluidine (DHT) | N/A | 1 min |

Next, a variety of primary, secondary, and tertiary amines were examined in methacrylate resins systems determine curing times by adhering two glass vials together (bottom to bottom). See Table 1. None of the amines initiated curing using dicumyl peroxide. This peroxide turned out not to be reactive at all at room temperature. When benzoyl peroxide was used, all but 2,4,6-trimethyl aniline, triethyl amine, and N-methyl aniline, failed to initiate curing. 2,4,6-Trimethyl aniline was a partially successful sample, but still did not yield a rapid curing time when compared to an amine used in dental resins, N,N-Bis(2-hydroxyethyl)-p-toluidine (DHT), which cured the methacrylate resin 15 times faster than 2,4,6-trimethyl aniline.

The addition of protecting groups to the alcohol groups of DHT was examined to determine if protection of the alcohol moieties on the amine could inhibit radical formation. To effectuate protection, TIPS chloride, acyl chloride, and palmityl chloride were reacted with the alcohol groups in dichloromethane in the presence of excess triethylamine. As shown in Table 2, the bigger and more electron withdrawing the group the greater the cure time, but none of the protecting groups stopped the methacrylate polymerization from occurring.

TABLE 2

DHT derivatives that were examined in UDMA:MMA (66:30 to 68:30) in the presence of a benzoyl peroxide (1.2 wt %).

| Amine Compounds | Weight percentage in UDMA:MMA (7:3) | Cure Time |
|---|---|---|
| N,N-Bis(2-hydroxyethyl)-p-toluidine (DHT) | 0.6% | 1:24 min |

TABLE 2-continued

DHT derivatives that were examined in UDMA:MMA (66:30 to 68:30) in the presence of a benzoyl peroxide (1.2 wt %).

| Amine Compounds | Weight percentage in UDMA:MMA (7:3) | Cure Time |
|---|---|---|
| 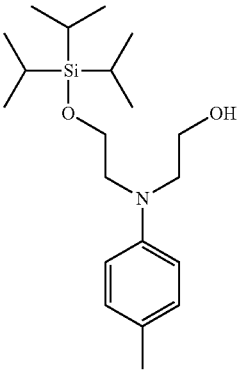 [SMILES: Cc1ccc(N(CCO)CCO[Si](C(C)C)(C(C)C)C(C)C)cc1] | 1.1% | 3:40 min |
| 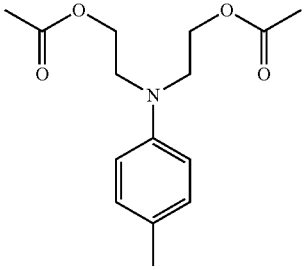 [SMILES: CC(=O)OCCN(CCOC(C)=O)c1ccc(C)cc1] | 0.9% | 10:10 min |
| 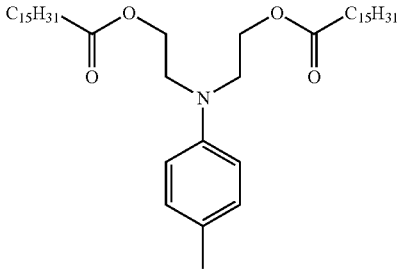 | 2.1% | 16:15 min |

Protected Ascorbates for Use in Water Triggered Initiation

Ascorbic acid can be an efficient initiator in methacrylate resins when well dispersed. When formed, a radical can be stabilized in the ring system of ascorbic acid. Additions to the 5 and 6 alcohol groups have minimal effects on the radical mechanism. Modifications at these positions can be used to increase solubility and improve the cure rate. For example, the cure rate is increased when ascorbyl palmitate (with slightly better solubility) was used instead of ascorbic acid.

TABLE 3

The three ascorbic acid derivatives with peroxide that were initially studied and there curing times in inhibitor free UDMA:MMA (70:30) with and without copper.

| Ascobic Acid Derivative | Percent Loading (wt %) | t-Bu-Peroxybenzoate wt % | Curing Time/Copper |
|---|---|---|---|
| 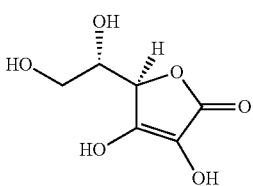 [SMILES: O=C1O[C@H]([C@@H](O)CO)C(O)=C1O] | 1 | 1.5 | 8 min/20 sec |

TABLE 3-continued

The three ascorbic acid derivatives with peroxide that were initially studied and there curing times in inhibitor free UDMA:MMA (70:30) with and without copper.

| Ascobic Acid Derivative | Percent Loading (wt %) | t-Bu-Peroxybenzoate wt % | Curing Time/Copper |
|---|---|---|---|
| [Structure: ascorbyl palmitate with C₁₅H₃₁ chain] | 2.5 | 1.5 | 5 min/<20 sec |
| [Structure: 5,6-Isopropylidene-L-Ascorbic Acid] | 3 | 5 | 8 min/34 sec |

5,6-Isopropylidene-L-Ascorbic Acid behaved similarly to ascorbyl palmitate, curing UDMA:MMA methacrylate resin in 8-10 min. See Table 3. Due to its synthetic simplicity, this compound was used as a building block for many of the curing studies. When it was realized that acyl protection of the 2 and 3 alcohols in the ascorbic acid ring prevented curing of the methacrylate resin, work focused on water-labile protection groups such as trimethyl silyl and trifluoroacetic groups at these positions. Further, protection of the 2 and/or the 3 alcohols significantly increased the solubility of the ascorbic acid derivatives.

Copper Catalyst

Copper (I) and iron (II) salts can be used to accelerate the cure reaction of the ascorbic acid/t-Butyl Peroxybenzoate system. However, solubility was found to be problematic. The solubility could be enhanced using an 18-crown-6 ether to dissolve anhydrous copper (I) chloride (1 to 1) in dichloromethane to yield a brown solution. When the copper solution (10 uL, 0.13 M) was added to a methacrylate system, it was cured in less than 1 min in most cases. The reaction was also quite exothermic. When looking at controlling the cure time, copper was added to a UDMA/MMA system at different concentrations. It was not until the copper at a concentration was 3 mg/mL to increase the cure time passed 1 minute. (Table 4)

TABLE 4

Curing times of UDMA:MMA ascorbic acid systems with different amount of copper added.

| Catalyst Conc. (mg/mL) | Catalyst Loading (ppm) | 100% UDMA (138 mmol AA + tBuBP)(s) | 90:10 UDMA:MMA (104 mmol AA + tBuBP)(s) |
|---|---|---|---|
| 60.00 | 6000 | 35 | 25 |
| 30.00 | 3000 | 75 | 34 |
| 15.00 | 1500 | 83 | 43 |
| 7.50 | 750 | 115 | 47 |
| 3.00 | 300 | 115 | 61 |
| 1.00 | 100 | 640 | 101 |
| 0.50 | 50 | 2050 | 250 |
| 0.10 | 10 | 4920 | 1290 |

Protection of Ascorbic Acid with Water Labile Moieties

The develop a water-activated curing system, the 2 and 3 alcohols of ascorbic acid were protected with water labile trimethylsilyl groups. The oil 5,6-Isopropylidene-2,3-Ditrimethylsilyl-L-Ascorbic Acid was very soluble in methyl methacrylate and very moisture sensitive. If exposed to water, the oil rapidly solidified. A stable methacrylate solution with benzoyl peroxide was not obtained. In many cases, 5,6-Isopropylidene-2,3-Ditrimethylsilyl-L-Ascorbic Acid appeared to be as or more reactive than the unprotected ascorbic acid when copper was added. In hydrophobic methyl methacrylate solution, a yellow color was observed within one hour, which is characteristic of polymethylmethacrylate formation. In UDMA:MMA (70:30, UDMA includes an inhibitor), ascorbic acid with peroxide takes >24 h to cure. In contrast, the silyl protected ascorbic acid takes about 2.5 h to cure the same system.

A viscosity study was performed in MMA/NMP solutions with added copper catalyst (10 mL at 1.3M in 1 g methacrylate resin). These studies were performed both under ambient atmosphere and under argon. In theory, if the silyl groups prevented initiation, the system exposed to the ambient atmosphere would be expected to cure more rapidly. Since methyl methacrylate did not harden well, the viscosity of the solution was examined by draining a volumetric pipet after aging the samples for 20 h (first 18 h was without copper and the last 2 h was with 10 μL of 0.13 M copper solution). The study suggests that the silyl group did not entirely prevent initiation, but did increase cure rate. (see Table 5)

TABLE 5

Relative viscosities of MMA:NMP solutions with Ditrimethylsilyl-L-Ascorbic Acid (27 mg/mL) and benzoyl peroxide (18 mg/mL). Studies were performed under ambient atmosphere (ATM) and inert atmosphere (Ar). Viscosity was standardized with MMA.

| Sample | Initial Viscosity | 18 h | 18 h/Cu Add + 2 h |
|---|---|---|---|
| 0% NMP ATM | 0.85 | 0.84 | 4.79 |
| 10% NMP ATM | 0.91 | 0.89 | 3.75 |
| 25% NMP ATM | 0.96 | 0.94 | 7.29 |

TABLE 5-continued

Relative viscosities of MMA:NMP solutions with Ditrimethylsilyl-L-Ascorbic Acid (27 mg/mL) and benzoyl peroxide (18 mg/mL). Studies were performed under ambient atmosphere (ATM) and inert atmosphere (Ar). Viscosity was standardized with MMA.

| Sample | Initial Viscosity | 18 h | 18 h/Cu Add + 2 h |
|---|---|---|---|
| 0% NMP Ar | | | 11.8 |
| 10% NMP Ar | | | 9.10 |
| 25% NMP Ar | | | 443 |
| MMA | 1.00 | | |

Solubility of Ascorbic Acid

Many ascorbic acid derivatives exhibit low solubility in methacrylate resins, except for the compounds that have the 2 and/or 3 alcohol protected. One way to improve efficiency of the polymerization would be to improve solubility. 5,6-dipivaloyl-ascorbic acid was synthesized and was soluble in UDMA:MMA (70:30) methacrylate resin. When t-Bu-peroxybenzoate (5 wt %) was added to the resin with 5,6-dipivaloyl-ascorbic acid (5 wt %), it cured in about 3 minutes and was noticeably exothermic. The compounds based off the 5,6-Isopropylidene-L-Ascorbic Acid with the 2 or 3 alcohol protected cured the UDMA:MMA system very slowly. Protection of the 2 and 3 alcohol with acetate prevented any curing even with added copper. (Table 6)

TABLE 6

Ascorbic Acid Derivatives with the 2 and/or 3 alcohols protected and the corresponding cure times with and without copper catalyst.

| Ascorbic Acid Derivatives | Weight percentage in UDMA:MMA (7:3) | Cure Time Without Copper | Cure Time Copper (3 mg/mL) |
|---|---|---|---|
| [structure] | 3.2% | 8 min | 20 sec |
| [structure] | 4.0% | >24 h | 4 h |
| [structure] | 3.4% | 38 min Gel | |
| [structure] | 4.5% | 45 min Gel | |

TABLE 6-continued

Ascorbic Acid Derivatives with the 2 and/or 3 alcohols protected and the corresponding cure times with and without copper catalyst.

| Ascorbic Acid Derivatives | Weight percentage in UDMA:MMA (7:3) | Cure Time Without Copper | Cure Time Copper (3 mg/mL) |
|---|---|---|---|
| [structure] | 5.0% | N/A | N/A |
| [structure] | 4.6% | N/A | N/A |

Trifluoroacetate Protection of the 2 and 3 Alcohols

The 2 and 3 ascorbyl alcohols were also protected with water labile trifluoroacetate groups by reaction with trifluoroacetic anhydride in the presence of base (e.g., an inorganic base, such as sodium carbonate).

5,6-Isopropylidene-2,3-ditrifluoroacetate-L-ascorbic acid was prepared. Like the acetate protected compounds, it was soluble in UDMA:MMA and EDMA resins. The best solvent for analyzing this material was THF. For the stability test EDMA was used due to the hydrophobic nature of the methacrylate and will protect the extreme hygroscopicity of the TFA protected material. When 60 mg dissolved in EDMA with t-Bu-peroxybenzoate (5 wt %) and copper (30 mg/mL, 10 μL), the cure time was about 1 h. When water (50 μL) was added to a second solution and shaken, a precipitate formed and the cure time was 46 sec. The TFA protected ascorbic acid hydrolysis can be observed in proton NMR and was very rapid. (FIG. 1).

Figure 2:
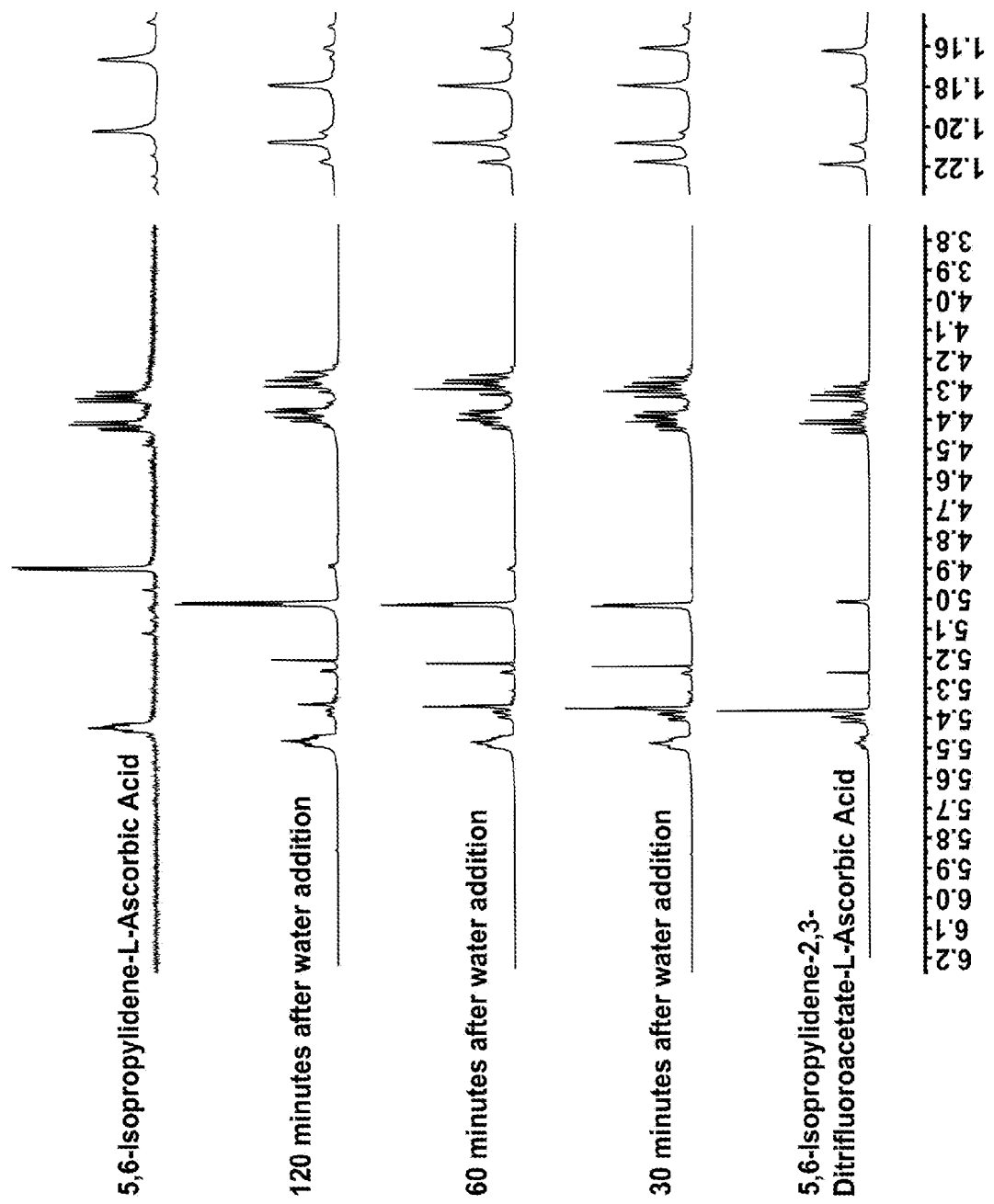
FIG. 2 shows the $^1$H-NMR of, from bottom to top, 5,6-dipivaloyl-2,3-ditrifluoroacetate-L-ascorbic acid (bottom trace), 5,6-dipivaloyl-2,3-ditrifluoroacetate-L-ascorbic acid upon incubation with water (50 μL) for 30 min (second trace from the bottom), 5,6-dipivaloyl-2,3-ditrifluoroacetate-L-ascorbic acid upon incubation with water (50 μL) for 60 min (third trace from the bottom), 5,6-dipivaloyl-2,3-ditrifluoroacetate-L-ascorbic acid upon incubation with water (50 μL) for 120 min (fourth trace from the bottom), and 5,6-dipivaloyl-L-ascorbic acid (top trace).
Figure 3:
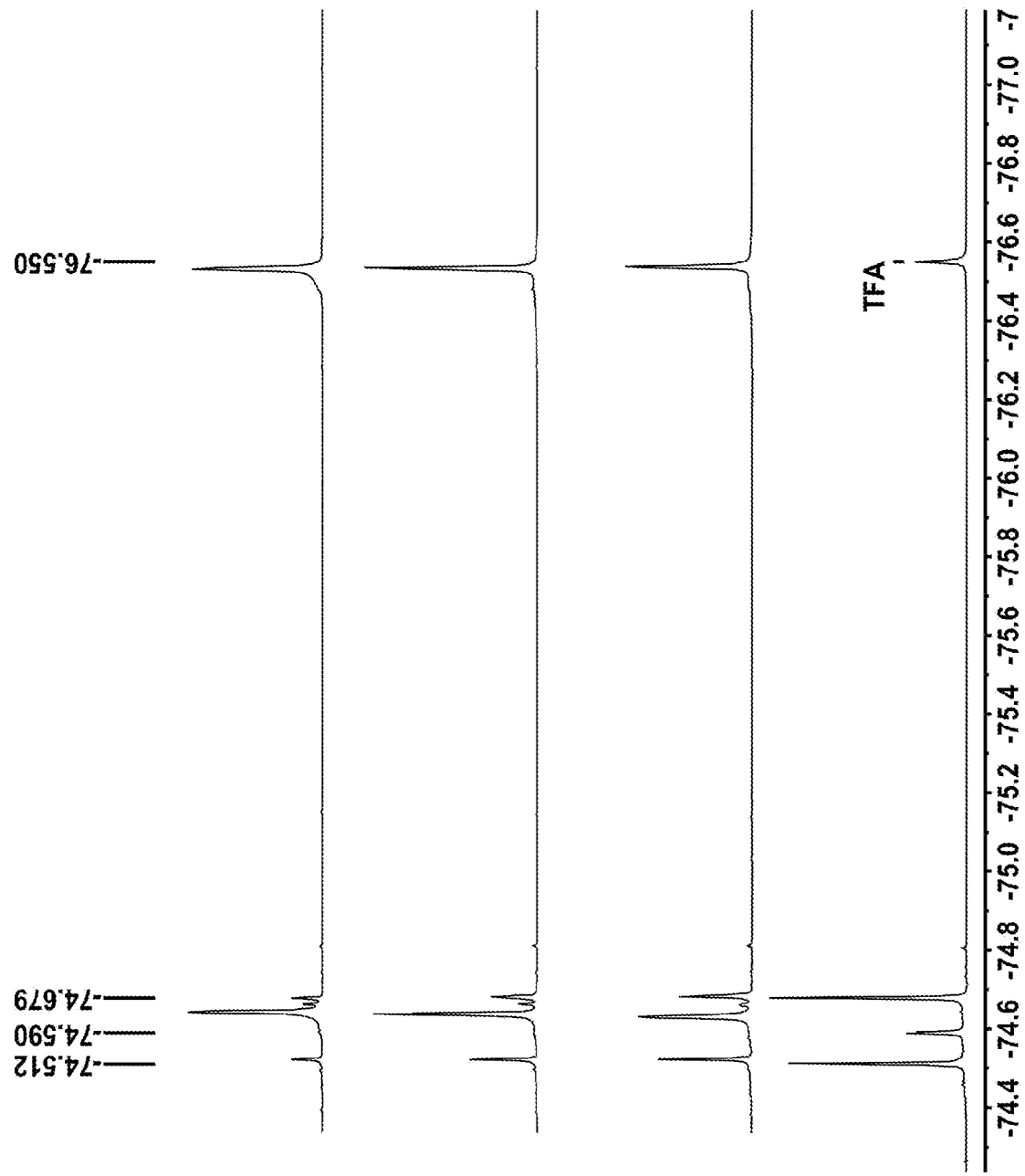
FIG. 3 shows the $^{19}$F-NMR of, from bottom to top, 5,6-dipivaloyl-2,3-ditrifluoroacetate-L-ascorbic acid (bottom trace), 5,6-dipivaloyl-2,3-ditrifluoroacetate-L-ascorbic acid incubated with water (50 μL) for 30 min (second trace from the bottom), 5,6-dipivaloyl-2,3-ditrifluoroacetate-L-ascorbic acid incubated with water (50 μL) for 60 min (third trace from the bottom), and 5,6-dipivaloyl-2,3-ditrifluoroacetate-L-ascorbic acid incubated with water (50 μL) for 120 min (top trace).
Figure 4:
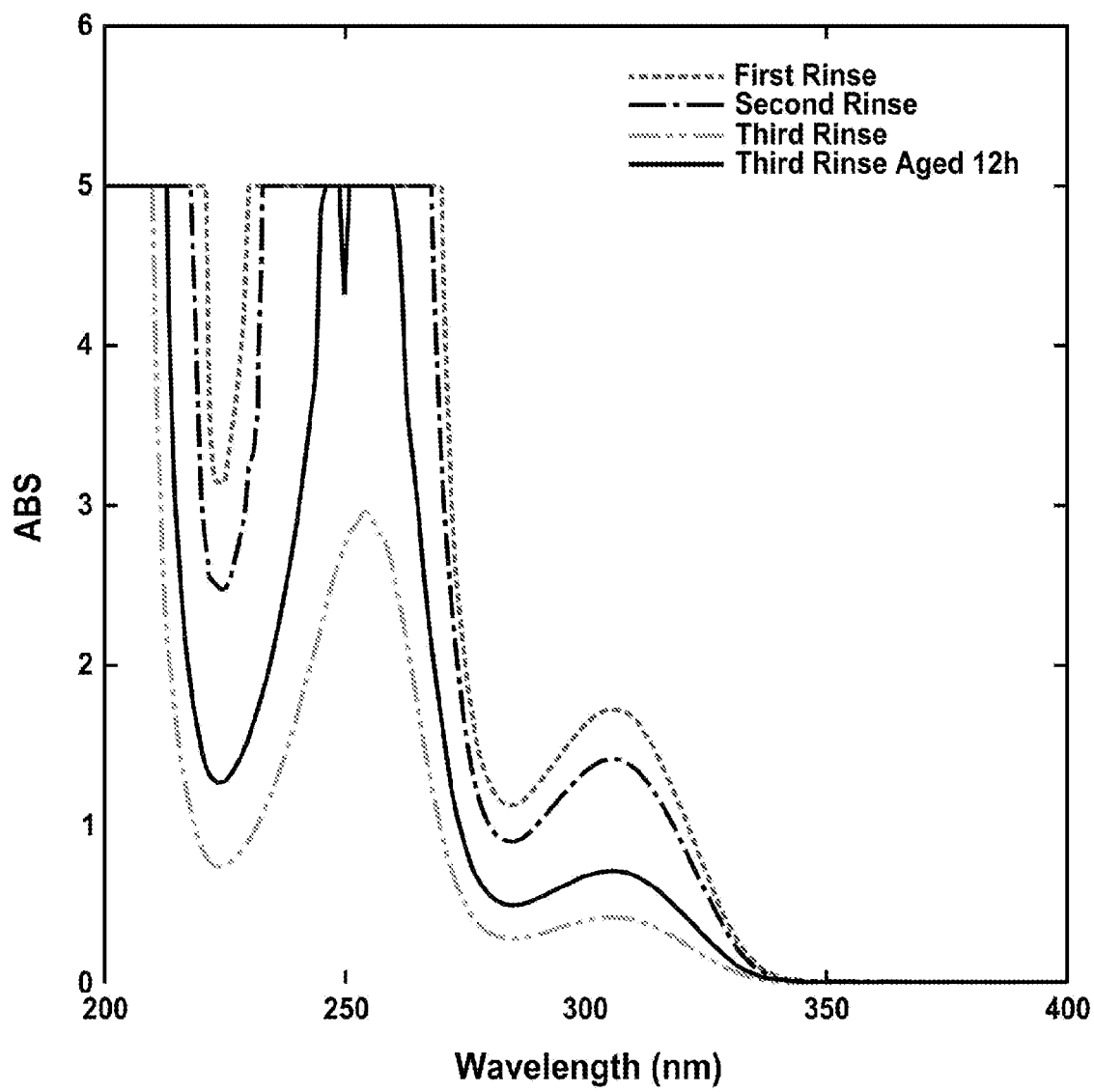
FIG. 4 shows UV-Vis spectra of an acetonitrile rinse of thick-walled microcapsules loaded with an example amine catalyst.

5,6-Dipivaloyl-2,3-ditrifluoroacetate-L-ascorbic acid was synthesized in a similar manner as the acetonide except the starting material has much better solubility and the reaction took place in dichloromethane. The compound is very sensitive to water and this can be seen in NMR. In chloroform-d, water was added to the diTFA-protected compound. This converted to the monoprotected compound in 2 h. (FIG. 2) The unprotected compound, 5,6-dipivaloyl-L-ascorbic acid, was observed as well, but the hydrolysis of the second TFA group was slow in CDCl$_3$. The hydrolysis of one of the TFA groups could clearly be seen in $^{19}$F-NMR. (FIG. 3). The TFA signal at −76.55 ppm was about the same as the monoprotected compound and showed a release of one TFA molecule observed from the disappearance of two fluorine signals to one. In the initial $^{19}$F-NMR, it appears that hydrolysis occurred during the sample preparation and a small amount of water could have been in the ampulla of CDCl$_3$.

5,6-Dipivaloyl-2,3-ditrifluoroacetate-L-ascorbic acid was dissolved in TEGMA (32 mg/mL) and was divided into two aliquots. To both 1 mL samples, t-Bu-peroxybenzoate (50 mg) was added. To one sample, water (50 mL) was added and shaken. This sample warmed and was cured in 45 sec. The dry sample cured much slower, about 5 min. It appears that the TFA protection inhibited the cure rate of the methacrylate resin. This suggests that 5,6-dipivaloyl-2,3-ditrifluoroacetate-L-ascorbic acid can function as a water-sensitive, highly active initiator. The cure time of the sample with water was very fast for a sample without copper and behaved more like an amine initiator.

Stability of 5,6-Dipivaloyl-2,3-Ditrifluoroacetate-L-Ascorbic Acid Resin Studies After the synthesis of 5,6-Dipivaloyl-2,3-Ditrifluoroacetate-L-Ascorbic Acid was achieved, this compound was tested for its stability in a resin including UDMA, PEGDMA, and t-butyl peroxybenzoate. Given that the UDMA is impure, with up to at least 10% HEMA, several attempts to remove any water, HEMA, or other potential nucleophiles were made.

UDMA was purified by stirring UDMA in dried benzene along with molecular sieves, a polymer bound sulfonyl chloride resin, and a hydroquinone/BHT inhibitor remover, for a period of from 1-4 days. The UDMA solution was then filtered and dried under vacuo. Next, a small aliquot of the tetra-substituted ascorbic acid derivative in DCM and one drop of t-butyl peroxybenzoate was added to the "purified" UDMA sample. Several drops of trifluoroacetic anhydride was added to protect the ascorbic acid derivative from hydrolysis and the mixture was placed in a glovebox. Unfortunately, the resin appeared to harden overnight.

In further attempts to purify the UDMA and prevent the premature curing of the resin system, the UDMA/benzene solution was stirred and dried in molecular sieves for 24 hours before mixing with the sulfonyl chloride bound polymer. This polymer was also increased up to 40% by weight but curing still could not be prevented past 6 hours. Alternatively, an unknown sample of BHT was added to another resin system including UDMA and the protected ascorbic acid initiator. After sitting at room temperature in a glove box for up to 3 days the resin did not cure until one drop of water was added to hydrolyze the trifluoroacetate groups. As a result, the resin hardened after 30 minutes.

Currently, the UDMA monomer can be more efficiently purified by flash column chromatography. This however removes the BHT inhibitor present as a commercial stabilizer and must be replaced upon concentrating the purified UDMA to prevent polymerization. At this point, curing of the "column purified" UDMA and ascorbic acid derivative resin system cannot be prevented with up to 417 ppm BHT. Further optimization for the stability of this one component system is underway, which includes increasing the concentration of BHT until curing of the resin is controlled.

Adhesion Studies

Phase one of the adhesion studies was to examine two-part systems using a more traditional initiating system, N,N-Bis(2-hydroxyethyl)-p-toluidine (DHT)/Benzoyl peroxide. Once a formulation had been determined that yielded good adhesion strength to three homogenous substrates, wood-to-wood, steel-to-steel, and aluminum-to-aluminum, phase two of the study would start where a soluble ascorbic acid derivative would be incorporated into the formulation. Adjustment of the formulation to maximize adhesion strength will continue until a water activated initiator was developed. Phase three was to convert the two-part system into a one-part system using the water active initiator. At this point, continued adjustments would be made to increase the adhesion.

Formulations S1-76 and S2-79 demonstrated that HEMA and 4-META worked well as adhesion promoters. 4-META appeared to be overall better then acrylic acid. MMA was used to decrease viscosity.

| S1-76 | | | |
|---|---|---|---|
| Component 1 | | Component 2 | |
| | Percentage | | Percentage |
| Resin | | Resin | |
| DHT | 2.5 | Benzoyl Peroxide | 2.5 |
| HEMA | 30 | MMA | 20 |
| UDMA | 67.5 | UDMA | 67.5 |
| Total | 100 | Acrylic Acid | 10 |
| | | Total | 100 |
| Fillers | | Fillers | |
| Hydrophobic Fumed Silica (Aerosil ® R 972) | 0 | Hydrophobic Fumed Silica (Aerosil ® R 972) | 0 |
| Ceramic Filler | 0 | Ceramic Filler | 0 |
| Additives | | Additives | |
| Water | 0 | Water | 0 |
| Adhesion | | | |
| Wood-Wood | 350 PSI | | |
| Steel-Steel | 150 PSI | | |
| Al-Al | 205 PSI | | |

| S2-79 | | | |
|---|---|---|---|
| Component 1 | | Component 2 | |
| | Percentage | | Percentage |
| Resin | | Resin | |
| DHT | 0.4 | Benzoyl Peroxide | 0.4 |
| HEMA | 30 | MMA | 20 |
| UDMA | 69.6 | UDMA | 69.6 |
| Total | 100 | 4-Meta | 10 |
| | | Total | 100 |
| Fillers | | Fillers | |
| Hydrophobic Fumed Silica (Aerosil ® R 972) | 0 | Hydrophobic Fumed Silica (Aerosil ® R 972) | 0 |
| Ceramic Filler | 0 | Ceramic Filler | 0 |
| Additives | | Additives | |
| Water | 0 | Water | 0 |
| Adhesion | | | |
| Wood-Wood | 250 PSI | | |
| Steel-Steel | 495 PSI | | |
| Al-Al | 550 PSI | | |

Once a suitable example methacrylate resin was determined, filler was added to the formation. First Aerosil R972 was examined as an example filled. It was determined that a loading of 20 wt % filler improved the adhesion strength while 5 wt % only improved the steel-to-steel samples. In S1-1-85 vs S3-1-85, ceramic filler was incorporated into the formulation. Four different samples were examined, and again 20 wt % of total filler amount yielded the strongest bonds. A sample with 16 wt % Ceramic filler and 4 wt % Aerosil R972 (S4-90) was best. While examining the filler, the addition of water to component 2 of the two-part system was found to improve adhesion strength significantly for the steel-to-steel sample. It was hypothesized that the water hydrolyzed 4-META's anhydride moiety to the corresponding di-acid. See, for example, S4-90 without water. When the 4-META was replaced with acrylic acid, the steel-to-steel adhesion weakened from about 1490 PSI to 590 PSI, but the aluminum-to-aluminum increased about two-fold (S4-90 vs. S6-90). Through the many studies, the amount of DHT/benzoyl peroxide was optimized for steel and aluminum at 0.6 wt %/1.6 wt %. (S4-2-2) The wood-to-wood adhesion became weaker most likely to a slower reaction rate.

| S1-1-85 | | | |
|---|---|---|---|
| Component 1 | | Component 2 | |
| | Percentage | | Percentage |
| Resin | | Resin | |
| DHT | 0.4 | Benzoyl Peroxide | 0.4 |
| HEMA | 30 | MMA | 20 |
| UDMA | 69.6 | UDMA | 69.6 |
| Total | 100 | 4-Meta | 10 |
| | | Total | 100 |
| Fillers | | Fillers | |
| Hydrophobic Fumed Silica (Aerosil ® R 972) | 5 | Hydrophobic Fumed Silica (Aerosil ® R 972) | 5 |
| Ceramic Filler | 0 | Ceramic Filler | 0 |
| Additives | | Additives | |
| Water | 0 | Water | 0 |
| Adhesion | | | |
| Wood-Wood | 200 PSI | | |
| Steel-Steel | 640 PSI | | |
| Al-Al | 445 PSI | | |

S3-1-85

| Component 1 | | Component 2 | |
|---|---|---|---|
| | Percentage | | Percentage |
| Resin | | Resin | |
| DHT | 0.4 | Benzoyl Peroxide | 0.4 |
| HEMA | 30 | MMA | 20 |
| UDMA | 69.6 | UDMA | 69.6 |
| Total | 100 | 4-Meta | 10 |
| | | Total | 100 |
| Fillers | | Fillers | |
| Hydrophobic Fumed Silica (Aerosil ® R 972) | 20 | Hydrophobic Fumed Silica (Aerosil ® R 972) | 20 |
| Ceramic Filler Additives | 0 | Ceramic Filler Additives | 0 |
| Water | 0 | Water | 0 |
| Adhesion | | | |
| Wood-Wood | 410 PSI | | |
| Steel-Steel | 620 PSI | | |
| Al-Al | 800 PSI | | |

S2-90

| Component 1 | | Component 2 | |
|---|---|---|---|
| | Percentage | | Percentage |
| Resin | | Resin | |
| DHT | 1.6 | Benzoyl Peroxide | 3.2 |
| HEMA | 30 | MMA | 20 |
| UDMA | 68.4 | UDMA | 66.8 |
| Total | 100 | 4-Meta | 10 |
| | | Total | 100 |
| Fillers | | Fillers | |
| Hydrophobic Fumed Silica (Aerosil ® R 972) | 2 | Hydrophobic Fumed Silica (Aerosil ® R 972) | 2 |
| Ceramic Filler Additives | 18 | Ceramic Filler Additives | 18 |
| Water | 0 | Water | 3.2 |
| Adhesion | S4-2-2 | | |
| Wood-Wood | 460 PSI | | |
| Steel-Steel | 1010 PSI | | |
| Al-Al | 650 PSI | | |

S3-90

| Component 1 | | Component 2 | |
|---|---|---|---|
| | Percentage | | Percentage |
| Resin | | Resin | |
| DHT | 1.6 | Benzoyl Peroxide | 3.2 |
| HEMA | 30 | MMA | 20 |
| UDMA | 68.4 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 11 | Ceramic Filler Additives | 11 |
| Water | 0 | Water | 3.2 |
| Adhesion | S8-2-2 | | |
| Wood-Wood | 660 PSI | | |
| Steel-Steel | 1185 PSI | | |
| Al-Al | 485 PSI | | |

S4-90

| Component 1 | | Component 2 | |
|---|---|---|---|
| | Percentage | | Percentage |
| Resin | | Resin | |
| DHT | 1.6 | Benzoyl Peroxide | 3.2 |
| HEMA | 30 | MMA | 20 |
| UDMA | 68.4 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| Adhesion | S8-2-2 | | |
| Wood-Wood | 520 PSI | | |
| Steel-Steel | 1490 PSI | | |
| Al-Al | 475 PSI | | |

S6-90

| Component 1 | | Component 2 | |
|---|---|---|---|
| | Percentage | | Percentage |
| Resin | | Resin | |
| DHT | 1.6 | Benzoyl Peroxide | 3.2 |
| HEMA | 30 | MMA | 20 |
| UDMA | 68.4 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| Adhesion | S8-2-2 | | |
| Wood-Wood | 565 PSI | | |
| Steel-Steel | 590 PSI | | |
| Al-Al | 925 PSI | | |

S4-90 w/o Water

| Component 1 | Percentage | Component 2 | Percentage |
|---|---|---|---|
| Resin | | Resin | |
| DHT | 1.2 | Benzoyl Peroxide | 3.2 |
| HEMA | 30 | MMA | 20 |
| UDMA | 68.8 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 0 |
| Adhesion | S4-90 | | |
| Wood-Wood | 545 PSI | | |
| Steel-Steel | 580 PSI | | |
| Al-Al | 570 PSI | | |

S4-2-2

| Component 1 | Percentage | Component 2 | Percentage |
|---|---|---|---|
| Resin | | Resin | |
| DHT | 1.2 | Benzoyl Peroxide | 3.2 |
| HEMA | 30 | MMA | 20 |
| UDMA | 68.8 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| Adhesion | S4-2-2 | | |
| Wood-Wood | 385 PSI | | |
| Steel-Steel | 1605 PSI | | |
| Al-Al | 770 PSI | | |

The next variation to the evolving formulation was to add a silane additive. GF-9 (N-(2-aminoethyl)-3-aminopropyltrimethoxysilane) was selected for proof-of-principle studies. The addition of GF-9 to component 1 resulted in a significant increase in wood-to-wood adhesion but a slight decrease of the steel-to-steel adhesion. See, for example, S8-8-2 vs. S4-90 without water. When GF-9 was added to component 2 first and aged for 2 h and then adding 1.6 wt % of water, all the substrates yielded 600 PSI plus. See S5-4-2.

S8-2-2

| Component 1 | Percentage | Component 2 | Percentage |
|---|---|---|---|
| Resin | | Resin | |
| DHT | 1.2 | Benzoyl Peroxide | 3.2 |
| HEMA | 30 | MMA | 20 |
| UDMA | 68.8 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 0 |
| GF-9 | 0.1 | | |
| Adhesion | S8-2-2 | | |
| Wood-Wood | 720 PSI | | |
| Steel-Steel | 375 PSI | | |
| Al-Al | 450 PSI | | |

S5-4-2

| Component 1 | Percentage | Component 2 | Percentage |
|---|---|---|---|
| Resin | | Resin | |
| DHT | 1.2 | Benzoyl Peroxide | 3.2 |
| HEMA | 30 | MMA | 20 |
| UDMA | 68.8 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 1.6 |
| | | GF-9 | 0.1 |
| Adhesion | S5-4-2 | | |
| Wood-Wood | 765 PSI | | |
| Steel-Steel | 955 PSI | | |
| Al-Al | 625 PSI | | |

The hypothesis was that the free amine of GF-9 would react with the 4-META and yield a silane anchor with a methacrylate tail. (Scheme 1)

Scheme 1: Potential GF-9 reaction with 4-META.

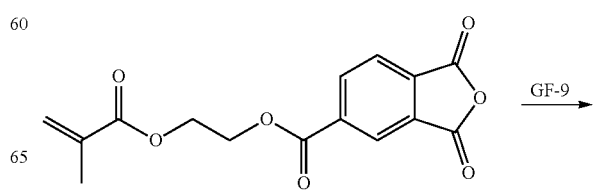

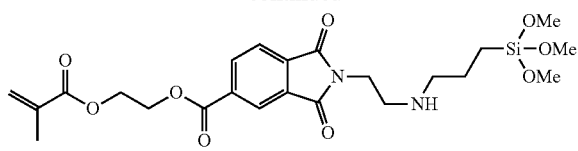

When the GF-9 was slightly decreased and the water was increased back to 3.2 wt %, the adhesion between wood weakened, but the aluminum and steel had good adhesion values. (S4-90 GF75)

S4-90 GF75

| Component 1 | Percentage | Component 2 | Percentage |
|---|---|---|---|
| Resin | | Resin | |
| DHT | 1.2 | Benzoyl Peroxide | 3.2 |
| HEMA | 30 | MMA | 20 |
| UDMA | 68.8 | UDMA | 66.8 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| | | GF-9 | 0.075 |
| Adhesion | S4-2-2 | | |
| Wood-Wood | 560 PSI | | |
| Steel-Steel | 1420 PSI | | |
| Al-Al | 810 PSI | | |

S4-90 Piv

| Component 1 | Percentage | Component 2 | Percentage |
|---|---|---|---|
| Resin | | Resin | |
| diPivAA | 10 | t-Bu-PB | 10 |
| HEMA | 20 | MMA | 10 |
| UDMA | 70 | UDMA | 70 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| | | GF-9 | 0.075 |
| Adhesion | S8-2-2 | | |
| Wood-Wood | 325 PSI | | |
| Steel-Steel | 1320 PSI | | |
| Al-Al | 550 PSI | | |

S4-90 TMA

| Component 1 | Percentage | Component 2 | Percentage |
|---|---|---|---|
| Resin | | Resin | |
| TMA | 1.2 | Benzoyl Peroxide | 2.4 |
| HEMA | 30 | MMA | 20 |
| UDMA | 68.8 | UDMA | 67.6 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| | | GF-9 | 0.075 |
| Adhesion | S5-4-2 | | |
| Wood-Wood | 683 PSI | | |
| Steel-Steel | 735 PSI | | |
| Al-Al | 403 PSI | | |

With a good starting formulation, S4-90 GF75, other initiators were used to replace DHT. N,N,4-Trimethyl aniline (TMA) was used and was much more reactive then DHT, so the benzoyl peroxide was adjusted to 2.4 wt %. This still led to a faster curing time and, the steel-to-steel and aluminum-to-aluminum adhesion was weakened. The faster cure time was believed to be the reason for the increase of the wood-to-wood adhesion.

S4-90 Piv BP 4

| Component 1 | Percentage | Component 2 | Percentage |
|---|---|---|---|
| Resin | | Resin | |
| diPivAA | 2.5 | t-Bu-PB | 4 |
| HEMA | 30 | MMA | 20 |
| UDMA | 67.5 | UDMA | 66 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| | | GF-9 | 0.075 |
| Adhesion | S8-2-2 | | |
| Wood-Wood | — | | |
| Steel-Steel | 1860 PSI | | |
| Al-Al | 1100 PSI | | |

S4-90 Piv BP 6

| Component 1 | Percentage | Component 2 | Percentage |
|---|---|---|---|
| Resin | | Resin | |
| diPivAA | 2.5 | t-Bu-PB | 6 |

-continued

S4-90 Piv BP 6

| Component 1 | Percentage | Component 2 | Percentage |
|---|---|---|---|
| HEMA | 30 | MMA | 20 |
| UDMA | 67.5 | UDMA | 64 |
| Total | 100 | 4-Meta | 10 |
| | | Total | 100 |
| Fillers | | Fillers | |
| Hydrophobic Fumed Silica (Aerosil ® R 972) | 4 | Hydrophobic Fumed Silica (Aerosil ® R 972) | 4 |
| Ceramic Filler Additives | 16 | Ceramic Filler Additives | 16 |
| Water | 0 | Water | 3.2 |
| | | GF-9 | 0.075 |
| Adhesion | S8-2-2 | | |
| Wood-Wood | — | | |
| Steel-Steel | 2348 PSI | | |
| Al-Al | 1380 PSI | | |

The DHT/benzoyl peroxide system was replaced with the 5,6-dipivaloyl-ascorbic acid/t-Bu-peroxybenzoate system as with slight variations with the base methacrylate resins, HEMA, MMA, and UDMA, while keeping the 4-META, fillers, and additives the same. The result was promising, yielding an adhesive with about the same steel-to-steel and adhesion strength. The wood-to-wood adhesion suffered due to time curing time being slightly slower than the DHT system. More adhesion studies were done using the 5,6-dipivaloyl-ascorbic acid/t-Bu-peroxybenzoate. These two samples were formulated to be closer to the amine systems (S4-90 Piv BP 4 and S4-90 Piv BP 6) and only UDMA was adjusted. The adhesion for steel and aluminum were excellent but wood had a very slow setting time of about 3 to 4 h.

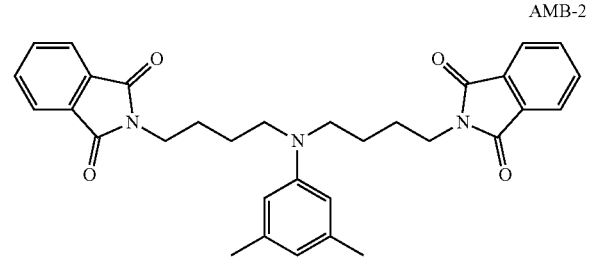 [SMILES: Cc1cc(C)cc(N(CCCCN2C(=O)c3ccccc3C2=O)CCCCN2C(=O)c3ccccc3C2=O)c1]

AMB-2

Other formulation results include the incorporation of the bulky amine AMB-2 as the initiator with benzoyl peroxide. A complete list of the formulations and compositions are included in Tables 7 and 8. Table 7 describes the components of the best performing adhesive formulation for each substrate. Table 8 includes the shear testing results with Gorilla Glue as a reference. For example, CMC-13, employing Bis[2-(methacryoyloxy)ethyl] phosphate (B2MEP) in Component 2 without water, allowed for great steel-steel adhesion results. Similarly, replacing B2MEP with 4-META/water increased the aluminum-aluminum results significantly. For comparison, replacing AMB-2 with 5,6-dipivaloyl ascorbic acid/t-Bu-peroxybenzoate the aluminum-aluminum adhesion weakened to 1594 PSI (data not in table).

In example CMC-24, again the amine AMB-2 was used. Due to the porous surface of the ceramic material, an increased amount of microporous silica was used to improve the performance of the adhesive compositions. Upon a further increase in silica concentration (results not shown), the adhesion strength began to decrease. The wood-wood adhesion results shown in CMC-16 are provided using even a higher concentration of silica filler and employing methyl methacrylate. It is also worth mentioning that these results were obtained with 6/8 of the wood samples failing providing an average shear strength of 505 PSI.

The mixed surface testing did not have as good a result as the Gorilla Glue with the exception of the ceramic to aluminum adhesion. Based on the compositions, the formula used for the ceramic to aluminum adhesion is the same as the optimal formulation for each individual surface. The formulations for the steel-aluminum and wood-aluminum lacked the monomers from the best performing formulations, Bis[2-(MAO)E]P and MMA respectively.

Key for chemical abbreviations in Table 7 below.

UDMA Urethane Dimethacrylate
PEGDMA-400 Polyethylene glycol Dimethacrylate
4-META Methacryloxy ethyl trimellitic Anhydride
Bis[2-(MAO)E]P Bis[2-(Methacryoyloxy)ethyl] Phosphate
MMA Methyl methacrylate
GDMAM: Glycerol Dimethacrylate/Maleate
Amine: AMB-2, Large Molecular Weight Amine

TABLE 7

Composition of best performing adhesive compositions for various substrates.

| | Part A | | | | Part B | | | | | | | |
|---|---|---|---|---|---|---|---|---|---|---|---|---|
| Best Adhesive Composition | UDMA (mg) | Amine (AMB-2) (mg) | Silica (mg) | PEGDMA-400 (mg) | UDMA (mg) | Benzoyl Peroxide (mg) | Silica (mg) | PGDMA-400 (mg) | 4-META (mg) | Bis[2-(MAO)E]P (mg) | GDMAM (mg) | MMA (mg) | Water (wt %) |
| Al-Al (CMC-11) | 8.8 | 1.2 | 20 | 30 | 66.8 | 3.2 | 20 | 20 | 10 | | | | 1.6 |
| Steel-Steel (CMC-13) | 68.8 | 1.2 | 20 | 30 | | | 20 | 25 | | 5 | | | 1.6 |
| | | | | | 66.8 | 3.2 | | | | | | | |
| Nylon to Nylon | 68.8 | 2.4 | 25 | 40 | 66.8 | 6.4 | 25 | 30 | | | | 24 | |

TABLE 7-continued

Composition of best performing adhesive compositions for various substrates.

Composition of the Adhesive Composition

| | Part A | | | | Part B | | | | | | | |
|---|---|---|---|---|---|---|---|---|---|---|---|---|
| Best Adhesive Composition | UDMA (mg) | Amine (AMB-2) (mg) | Silica (mg) | PEGDMA-400 (mg) | UDMA (mg) | Benzoyl Peroxide (mg) | Silica (mg) | PGDMA-400 (mg) | 4-META (mg) | Bis[2-(MAO)E]P (mg) | GDMAM (mg) | MMA (mg) | Water (wt %) |
| Ceramic to Ceramic (CMC 24) | 68.8 | 1.2 | 40 | 30 | 66.8 | 3.2 | 40 | 20 | 10 | | | | 1.6 |
| Wood to Wood (CMC-16) | 68.8 | 1.2 | 40 | 30 | 66.8 | 3.2 | 40 | 10 | 10 | | | 17 | 16 |
| Wood to Al | 68.8 | 1.2 | 40 | 30 | 66.8 | 3.2 | 40 | 20 | 10 | | | | 1.6 |
| Ceramic to Al | 68.8 | 1.2 | 20 | 30 | 66.8 | 3.2 | 20 | 20 | 10 | | | | 1.6 |
| Steel to Al | 68.8 | 1.2 | 20 | 30 | 66.8 | 3.2 | 20 | 20 | 10 | | | | 1.6 |

TABLE 8

Performance of various adhesive compositions.

| Formulation | Cure (Hrs) | Peak Load (N) | PSI | Load at Break (N) | PSI | Sample Size |
|---|---|---|---|---|---|---|
| Aluminum to Aluminum Adhesion | | | | | | |
| Gorilla Glue | 24 | 1534.25 | 689.83 | 392.25 | 176.36 | 4 |
| Epoxy | 2 | 2639.00 | 1186.54 | 757.00 | 340.36 | 5 |
| Methacrylate CMC-11 | 2 | 2249.56 | 1011.44 | 647.89 | 291.30 | 9 |
| Microcapsule | 2 | 1663.60 | 747.99 | 513.00 | 230.65 | 5 |
| Steel to Steel Adhesion | | | | | | |
| Gorilla Glue | 24 | 1643.84 | 739.10 | 443.11 | 199.23 | 19 |
| Epoxy | 2 | 2645.22 | 1189.34 | 747.33 | 336.02 | 9 |
| Methacrylate CMC-13 | 2 | 4404.38 | 1980.29 | 1505.50 | 676.90 | 8 |
| Nylon to Nylon Adhesion | | | | | | |
| Gorilla Glue | 24 | 1644.00 | 739.17 | 463.60 | 208.44 | 5 |
| Best Methacrylate | 2 | 1110.60 | 499.35 | 296.80 | 133.45 | 5 |
| Ceramic to Ceramic Adhesion | | | | | | |
| Gorilla Glue | 24 | 790.00 | 355.20 | 0.00 | 0.00 | 5 |
| Methacrylate CMC-24 | 2 | 943.00 | 423.99 | 0.00 | 0.00 | 4 |
| Wood to Wood Adhesion | | | | | | |
| Gorilla Glue | 24 | 447.75 | 201.32 | 0.00 | 0.00 | 4 |
| Methacrylate CMC-16 | 2 | 505.88 | 227.45 | 0.00 | 0.00 | 8 |
| Wood to Aluminum Adhesion | | | | | | |
| Gorilla Glue | 24 | 1137.29 | 511.34 | 294.43 | 132.38 | 7 |
| Best Performing Methacrylate | 2 | 864.50 | 388.70 | 228.67 | 102.81 | 6 |
| Ceramic to Aluminum Adhesion | | | | | | |
| Gorilla Glue | 24 | 438.67 | 197.23 | 124.00 | 55.75 | 6 |
| Best Methacrylate | 2 | 1113.13 | 500.48 | 312.25 | 140.39 | 8 |
| Steel to Aluminum Adhesion | | | | | | |
| Gorilla Glue | 24 | 2880.13 | 1294.96 | 740.75 | 333.06 | 8 |
| Best Methacrylate | 2 | 1536.67 | 690.91 | 447.58 | 201.24 | 12 |

Microencapsulation

The first set of microcapsules examined included t-Bu-peroxybenzoate. The microcapsules are water dispersible and clump in organic media. To mask the hydrophilic surface in order allow even dispersion in methacrylate resin, surfactants with a hydrophilic-lipophilic-balance (HLB) of 6 to 9 were used. In this case, ascorbyl palmitate was used as a surfactant. To the microcapsule mixture, ascorbyl palmitate (1:1) was shaken until homogenous. The mixture was then freeze dried to obtain a powder that was dispersed into MMA. Unfortunately, when the MMA mixture was added to UDMA to give a 70:30 mixture, the resin reacted with in a minute when copper catalyst was added. This suggested that the microcapsule was unstable.

The next set of microcapsules contained TMA. The sample with thinner microcapsule walls obviously was leaking due to the odor and color of the water layer. When this mixture was added to a UDMA/MMA (7:3) solution with benzoyl peroxide, an immediate reaction was observed and the system was cured in under 20 seconds. The sample with thicker walls seemed more promising. A slight odor was observed, but the water was not yellow. A reaction still occurred when added to a solution containing UDMA/MMA (7:3) and benzoyl peroxide. To address this, the TMA microcapsules were washed. First, SPAN 40® surfactant was introduced to the microcapsule mixture (a 1:1 by weight ratio). The mixture was heated to 65° C. and swirled periodically. After the surfactant was dissolved, the mixture was allowed to cool and freeze dried. The resulting powder was taken up into acetonitrile (5 mL) and filtered. UV-Vis spectroscopy was used to detect TMA, which can be exhibits a characteristic absorbance at approximately 310 nm. TMA concentration was found to decrease as the sample was washed with two more time with acetonitrile (5 mL each wash). The acetonitrile used in the third wash was added back to the microcapsules and aged for 12 h. The microcapsules were filtered off and UV-Vis showed an increase of TMA in solution. This suggested that the microcapsules were still leaking in spite of the thicker microcapsule wall. It was hypothesized that the TMA molecule was too small and a bulky amine, AMB-2, should be synthesized. Fortunate, bulky amines that initiate methacrylate systems have been reported and the synthesis was very economical. (Scheme 2)

Scheme 2: Synthesis of a bulky amine that initiates methacrylate resins at about the same cure time as DHT.

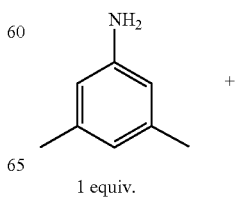

1 equiv.

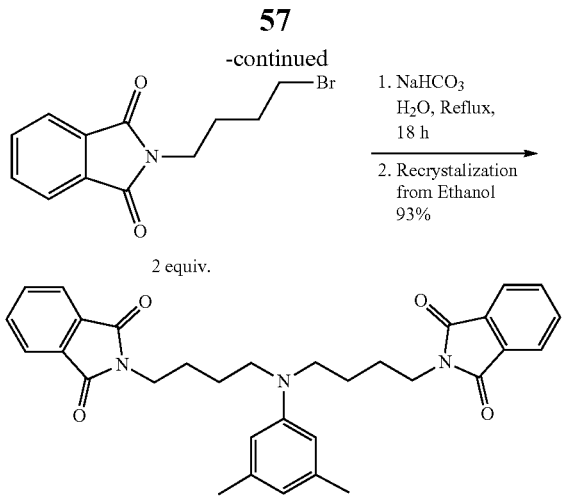

As shown in Table 9, demonstrates that the microcapsules will produce a bond strength comparable to Gorilla Glue with a cure time of two hours. Table 10 shows the composition of the microcapsule adhesive resin.

TABLE 9

Al-Al adhesion of various adhesive formulations.

| Formulation | Cure Time (Hrs) | Average Peak Load (N) | PSI | Average Load at Break (N) | PSI | Sample Size |
|---|---|---|---|---|---|---|
| Gorilla Glue | 24 | 1534.25 | 689.83 | 392.25 | 176.36 | 4 |
| Epoxy | 2 | 2639.00 | 1186.54 | 757.00 | 340.36 | 5 |
| Best Methacrylate | 2 | 2249.56 | 1011.44 | 647.89 | 291.30 | 9 |
| Microcapsule | 2 | 1663.60 | 747.99 | 513.00 | 230.65 | 5 |

TABLE 10

Composition of the microcapsule adhesive resin.

| | UDMA (mg) | Micro-capsules (mg) | Benzoyl Peroxide (mg) | PEGDMA-400 (mg) | 4-META (mg) | Silica (mg) | Water (% wt) |
|---|---|---|---|---|---|---|---|
| Microcapsule Formulation | 56 | 14.54 | 1.41 | 24.91 | 3.68 | 27.27 | 1.6 |

It was theorized that by using a bulky initiator, the amine can remain encapsulated in the thicker walled microcapsule. UV-Vis experiments can be used to evaluate amine leakage in ethyl acetate and n-butanol solvents to determine the stability of microcapsules. Stable microcapsules could be used to fabricate a single-component pressure and/or abrasive activated adhesive.

After encapsulating the bulkier amine AMB-2, the formulation was prepared by first mixing the aqueous mixture of microcapsules (9 mL) with a 33 wt % solution of SPAN 40® in water. The microcapsule solution was then freeze dried and the water was removed under vacuum overnight. The dried microcapsules were then dispersed in a 70/30 UDMA/PEGDMA mixture. Benzoyl peroxide was added. Attempts were made to rupture the microcapsules in this mixture and initiate curing of the resin. For example, the resin was placed on a metal plate and scraped with a spatula, ground with a mortar and pestle, and placed between two steel plates and clamped overnight. In each attempt, polymerization of the resin was not initiated, and the clamped metal plates were not bonded.

The next resin sample prepared had less SPAN 40 (only 11.1 wt %), as it was hypothesized that the SPAN 40° might be preventing curing. The previous mentioned microcapsule rupturing tests to initiate curing was tried but failed again. However, after clamping two metal plates together overnight, the plates appeared to be weakly bonded.

Lastly, a resin sample was prepared without any SPAN 40° surfactant. The microcapsules appeared to be just as dispersed in the organic resin as compared to the samples with SPAN 40®. Thus, two metal plates were again clamped overnight. This time, the plates were successfully bonded, and this new microcapsule formula was used for additional adhesion studies to test the shear strength of the resin employing the microencapsulated amine, AMB-2. Additionally, the microcapsule/UDMA/PEGDMA/benzoyl peroxide formula could sit at room temperature for days and the resin appears to be stable without any sign of curing.

Additional Microcapsule-Based Resins

These experiments were done by placing the below formulation between two aluminum plates and curing for two hours. A shear strength test was performed to quantify the adhesion strength.

TABLE 11

Formulations for microcapsule cured methacrylate resins.

| Name | UDMA | Micro-capsules | BPO | PEGDMA | 4-META | Silica | H$_2$O |
|---|---|---|---|---|---|---|---|
| M1454 | 56 | 14.54 | 1.41 | 24.91 | 3.68 | 27.27 | 1.6 |
| M2760 | 47.38 | 27.60 | 1.085 | 21.10 | 3.11 | 23.07 | 1.6 |
| M1984 | 49.21 | 19.84 | 3.17 | 23.81 | 3.97 | 23.81 | 1.6 |
| M1600 | 55 | 16 | 1.41 | 25 | 2.69 | 27.27 | 1.6 |

KEY (all numbers in milligrams, except water which is wt %):
UDMA: Urethane Dimethacrylate
4-META: Methacryloxy ethyl trimellitic Anhydride
PEGDMA: Polyethylene glycol Dimethacrylate
BPO: Benzyol Peroxide
Silica: Microporous Silica

TABLE 12

Shear Strength of Adhesives

| Name | # Samples | Load at Break (N) | SD | Load at Peak (N) | SD |
|---|---|---|---|---|---|
| M1454 | 5 | 513.0 | 118.8 | 1663.6 | 350.0 |
| M2760 | 5 | 321.6 | 102.7 | 1126.8 | 238.6 |
| M1984 | 3 | 301.3 | 59.1 | 1337.6 | 250.9 |
| M1600 | 6 | 425.3 | 84.6 | 1517.3 | 228.7 |

Single Component Adhesive Formulation

The 5,6-Dipivaloyl-2,3-ditrifluoroacetate-L-ascorbic acid was used to cure a dimethacrylate. This an example of a one component system that is cured in the presence of water. 32 milligrams of the 5,6-Dipivaloyl-2,3-ditrifluoroacetate-L-ascorbic acid is dissolved in 1 mL of triethylene diol dimethacrylate (TEGDMA). To this 50 mg of t-Bu-peroxybenzoate was added. Upon the addition of 50 microliters of water, followed by mixing, the sample warmed and was cured in 45 sec.

Additional Microcapsule-Based Resins

Additional microcapsule-based resins were prepared in which 4-META was replaced with Bis(2-(Methacryloloxy)ethyl))phosphate. An example formulation is shown below.

| UDMA (mg) | Amine-Microcapsules (mg) | Benzoyl Peroxide (mg) | PEGDMA-400 | Bis(2-(Methacryl-oloxy)ethyl)) phosphate (mg) | Microporous Silica (mg) | Water (mg) |
|---|---|---|---|---|---|---|
| 520 | 135 | 13 | 231 | 36.12 | 253 | 30 |

The curing behavior of these additional resins were investigated. The resins were tacky in minutes and hand tight within 2 hours. The resins took approximately 24 hours to reach full cure.

Adhesion tests were performed between two aluminum specimens in a shear configuration. The results are shown in the table below. Note that P10 and P12 are both formulations with microcapsules with 1% amine. The only difference is that P10 has a smaller average capsule size, but they are otherwise identical.

TABLE 13

Shear Strength of microcapsule-based resins were prepared in which 4-META was replaced with Bis(2-(Methacryloloxy)ethyl))phosphate.

| Specimen | Curing Time (hr) | Load at Break (N) | Load at Peak (N) |
|---|---|---|---|
| P10 A Trial #1 | 24 | 579 | 2459 |
| P10 A Trial #2 | 24 | 751 | 2845 |
| P10 A Trial #3 | 24 | 443 | 1896 |
| P12 Trial #1 | 24 | 663 | 3136 |
| P12 Trial #2 | 24 | 635 | 1876 |
| Average 1% Microcapsules | 24 | 614 | 2442 |
| Gorilla Glue | 24 | 392 | 1534 |
| Loctite Instant Mix Epoxy | 2 | 757 | 2639 |
| Glatfelter Microcapsule with 4-META | 2 | 513 | 1664 |

Methods and Materials

General Methods. Ultra Violet-Visible (UV-Vis) spectroscopy were taken using a Shimadzu RF 5301pc using a cuvette with 1 mm path length at 25° C. All reactions were performed under a nitrogen atmosphere unless noted otherwise. Chromatographic separations were performed on silica gel 60 (230-400 mesh, 60 Å) using the indicated solvents. All solvents used were dried and distilled under nitrogen unless noted otherwise. Methacrylate resins were either distilled or passed through inhibitor removing media to remove radical scavengers and stored under inert atmosphere. 2,3,5,6-Tetraacetic-L-Ascorbic Acid, 5,6-Isopropylidene-2-benzyl-L-Ascorbic Acid, 5,6-Isopropylidene-3-benzyl-L-Ascorbic Acid, 5,6-Isopropylidene-2-Methyl-L-Ascorbic Acid, and 5,6-Isopropylidene-3-Methyl-L-Ascorbic Acid, Isopropylidene-2-Acetyl-L-Ascorbic Acid, and Isopropylidene-3-Acetyl-L-Ascorbic Acid were synthesized according to the procedures below.

5,6-Isopropylidene-L-Ascorbic Acid: A flask was charged with L-Ascorbic Acid (30.0 g, 170 mmol) and dry acetone (225 mL). The mixture was stirred well. Slowly, acetyl chloride (0.54 g, 6.9 mmol, 0.60 mL) was added to the mixture. The reaction was left for 24 h at room temperature. The resulting fine white powder was filtered to yield the product (31.4 g, 145 mmol, 85%) without further purification. $^1$H-NMR (400 MHz; DMSO): δ 4.70 (d, J=2.9 Hz), 4.26 (td, J=6.6, 2.9 Hz), 4.09 (dd, J=8.4, 7.1 Hz), 3.88 (dd, J=8.4, 6.3 Hz), 1.25 (s).

5,6-Isopropylidene-2,3-Dibenzyl-L-Ascorbic Acid: 5,6-Isopropylidene-L-Ascorbic Acid (31.4 g, 145 mmol) was dissolved in a potassium hydroxide water solution (94 mL, 3.25 M). Tetrabutylammonium iodide (9.43 g, 25.5 mmol) was dissolved in ethyl acetate (94 mL) and was added to the solution and stirred to mix both layers together. Slowly, benzyl bromide (51.9 g, 303 mmol, 36.1 mL) was added to the reaction flask. The reaction was left for 24 h and room temperature. The ethyl acetate was isolated and the water layer was extracted with ethyl acetate (3×100 mL). The combined organic layers were dried over sodium sulfate and the solvent was removed to yield a crude yellow oil. The yellow oil was purified by column chromatography (Hexanes:Ethyl Acetate, 100:0 to 80:20) to yield a off white solid. (34.6 g, 87.2 mmol, 60%) $^1$H-NMR (600 MHz; CDCl$_3$): δ 7.39-7.34 (m), 7.21 (dd, J=6.4, 2.9 Hz), 5.16 (dd, J=39.6, 11.4 Hz), 5.11 (dd, J=22.8, 11.4 Hz), 4.53 (d, J=3.2 Hz), 4.25 (td, J=6.8, 3.2 Hz), 4.08 (dd, J=8.5, 6.8 Hz), 4.01 (dd, J=8.4, 6.9 Hz), 1.41 (s), 1.37 (s).

2,3-Dibenzyl-L-Ascorbic Acid: 5,6-Isopropylidene-2,3-Dibenzyl-L-Ascorbic Acid (2.47 g, 6.23 mmol) was dissolved in acetonitrile (160 mL) and stirred. HCl (16 mL, 2 M) was added and the reaction was heated to 30° C. for 4 h. The reaction was allowed to cool to RT and the acetonitrile was removed. The residue was dissolved in ethyl acetate and washed with water (3×80 mL) and brine (1×80 mL). The organic layer was further dried over sodium sulfate. The ethyl acetate was removed to yield yellow oil the solidified to a white solid. (2.03 g, 5.71 mmol, 92%) $^1$H-NMR (600 MHz; CDCl$_3$): δ 7.38-7.33 (m), 7.23-7.22 (m), 5.19 (q, J=14.6 Hz), 5.11-5.05 (m), 4.69 (d, J=2.4 Hz), 3.93-3.92 (m), 3.82-3.74 (m), 2.87 (s), 2.74 (s).

5,6-Dipivaloyl-2,3-Dibenzyl-L-Ascorbic Acid: 2,3-Dibenzyl-L-Ascorbic Acid (2.38 g, 6.68 mmol) was dissolved in dry dichloromethane (20 mL) and stirred. To this solution 4-dimethylaminopyridine (0.24 g, 2.0 mmol) and diisopropylethylamine (4 mL). Pivaloyl chloride (2.42 g, 20.0 mmol, 2.47 mL) was added dropwise and the reaction was left for an additional 1 h at RT. The reaction was diluted with dichloromethane (50 mL) and was washed with concentrated sodium carbonate (3×100 mL) and brine (1×100 mL). The organic layer was dried over sodium sulfate. The dichloromethane was removed and the residue was purified via column chromatography (Hexanes:Ethyl Acetate, 100:0 to 90:10) to yield a yellow oil. (2.79 g, 5.31 mmol, 80%) $^1$H-NMR (600 MHz; CDCl$_3$): δ 7.40-7.34 (m), 7.24-7.22 (m), 5.42 (ddd, J=7.3, 5.1, 2.1 Hz), 5.18-5.05 (m), 4.78 (d, J=2.0 Hz), 4.35 (dd, J=11.6, 5.0 Hz), 4.25 (dd, J=11.6, 7.5 Hz), 1.18 (s), 1.16 (s). $^{13}$C-NMR (151 MHz; CDCl$_3$): δ

177.9, 176.9, 168.7, 155.2, 136.1, 135.2, 129.0, 128.9, 128.8, 128.2, 121.8, 74.2, 73.9, 67.5, 62.5, 39.1, 38.9, 36.8, 27.2.

5,6-Dipivaloyl-L-Ascorbic Acid: 5,6-Dipivaloyl-2,3-Dibenzyl-L-Ascorbic Acid (3.51 g, 6.69 mmol) was dissolved in ethyl acetate (20 mL), methanol (20 mL), and water (0.5 mL). A stream of nitrogen was allowed to bubble in the solution for 20 min. Pd/C (350 mg, 10% Pd) was added to the reaction flask and the reaction was exposed to hydrogen (50 psi) for 1.5 h at RT. The hydrogen was removed and the black mixer was filtered through a celite plug. The solvent was removed to yield a white solid (1.90 g, 5.53 mmol, 83%). $^1$H-NMR (600 MHz; CDCl$_3$): δ 5.44-5.42 (m), 4.90 (d, J=2.9 Hz), 4.42 (dd, J=11.8, 4.6 Hz), 4.33 (dd, J=11.8, 7.0 Hz), 1.20 (s), 1.17 (s). $^{13}$C-NMR (151 MHz; CDCl$_3$): δ 178.4, 177.4, 169.7, 147.9, 119.6, 74.6, 67.8, 62.3, 39.0, 38.8, 27.0, 26.9.

5,6-Dipivaloyl-2,3-Ditrifluoroacetate-L-Ascorbic Acid: 5,6-Dipivaloyl-L-Ascorbic Acid (400 mg, 1.16 mmol) was added to a flame dried flask with flame dried sodium carbonate (800 mg, 7.55 mmol). The solids were suspended in dichloromethane (5 mL), stirred, and cooled in a, ice bath to 0° C. Trifluoroacetic anhydride (732 mg, 3.49 mmol, 0.492 mL) was added dropwise. The reaction was allowed to warm to RT and left for an additional 2 h. The mixture was filtered through dry celite (heated to 150° C. for 24 h) using schlenk techniques under nitrogen. The dichloromethane was removed via vacuum transfer to yield yellow oil (266 mg, 0.500 mmol, 43%). $^1$H-NMR (400 MHz; CDCl$_3$): δ 5.46-5.42 (m), 4.47 (dd, J=11.7, 5.2 Hz), 4.36 (dd, J=11.7, 7.3 Hz), 1.21 (s), 1.15 (s); $^{19}$F-NMR (376 MHz; CDCl$_3$): δ −74.5, −74.7.

5,6-Isopropylidene-2,3-Ditrifluoroacetate-L-Ascorbic Acid: 5,6-Isopropylidene-L-Ascorbic Acid (1.00 g, 4.63 mmol) was added to a flame dried flask with flame dried sodium carbonate (2.50 g, 23.6 mmol). The solids were suspended in THF (20 mL), stirred, and cooled in a, ice bath to 0° C. Trifluoroacetic anhydride (2.97 g, 14.2 mmol, 2.00 mL) was added dropwise. The reaction was allowed to warm to RT and left for an additional 2 h. The mixture was filtered through dry celite (heated to 150° C. for 24 h) using schlenk techniques under nitrogen. The THF was removed via vacuum transfer to yield a white solid (870 mg, 2.13 mmol, 46%). $^1$H-NMR (600 MHz; THF): δ 4.39 (d, J=4.3 Hz), 4.17 (q, J=5.6 Hz), 4.02 (t, J=7.5 Hz), 3.95 (t, J=7.7 Hz), 1.25 (s), 1.22 (s).

5,6-Isopropylidene-2,3-Ditrimethylsilyl-L-Ascorbic Acid: 5,6-Isopropylidene-L-Ascorbic Acid (6.00 g, 27.8 mmol) was dissolved in THF (55 mL) and triethylamine (5.98 g, 59.1 mmol, 8.24 mL). Slowly, trimethylsilyl chloride (6.42 g, 59.1 mmol, 7.51 mL) was added via syringe to the stirred reaction. Following the addition, the reaction was heated and refluxed for 2 h. The mixture was cooled. Using Schlenk techniques, the reaction was filtered through a dry celite plug under argon. The solvent was removed and the oil was left under vacuum for 24 h. This yielded a slight brown oil product (6.87 g, 191 mmol, 67%). The oil will decompose quickly to a white solid in the presence of water. $^1$H-NMR (600 MHz; CDCl$_3$): δ 4.44 (dd, J=3.7, 1.7 Hz), 4.20-4.18 (m), 4.10 (dd, J=8.5, 6.6 Hz), 4.02-4.00 (m), 1.36 (s), 1.33 (s), 0.29 (s), 0.28 (s).

General Copper Catalyst Procedure: A flask was charged with brown copper (I) chloride (1 equiv.), 18-crown-6 (1 equiv.), and dichloromethane (60 µL/mg CuCl). The mixture was sonicated for 60 min to yield a brown solution. The brown solution was transferred to a clean flask under argon via syringe. (volume was recorded) the remaining CuCl was dried and weighed and the copper (I) concentration was determined.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A single-component adhesive composition comprising:
   a curable mixture comprising an ethylenically unsaturated monomer;
   a microencapsulated hydrophobic amine having a molecular weight of at least 175 Da dispersed within the curable mixture; and
   an oxidant that can generate a free radical upon reaction with the hydrophobic amine, such as a peroxide;
   wherein the composition is packaged in a sealed container such that the composition protected from atmospheric moisture,
   wherein when packaged in the sealed container, the adhesive composition remains uncured for a period of at least 90 days.

2. The composition of claim 1, wherein the hydrophobic amine comprises a tertiary amine.

3. The composition of claim 1, wherein the hydrophobic amine comprises an aromatic tertiary amine.

4. The composition of claim 1, wherein the hydrophobic amine has a molecular weight of from 250 Da to 1,500 Da.

5. The composition of claim 1, wherein the hydrophobic amine is defined by Formula II

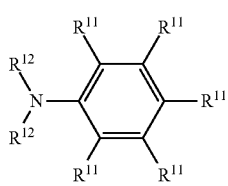

Formula II wherein
- $R^{11}$ is, independently for each occurrence, hydrogen, hydroxy, halogen, —CN, —NO$_2$, silyl, amino, alkylamino, dialkylamino, alkyl, heteroalkyl, haloalkyl, alkylthio, haloalkylthio, alkoxy, haloalkoxy, alkenyl, haloalkenyl, alkynyl, haloalkynyl, alkylsulfinyl, haloalkylsulfinyl, alkylsulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, heterodialkylaminocarbonyl, cycloalkyl, alkylcycloalkyl, cycloalkylalkyl, heterocyclyl, alkylheterocyclyl, heterocyclylalkyl, aryl, alkylaryl, alkylaryl, heteroaryl, and alkylheteroaryl, each optionally substituted with one or more substituents individually selected from $R^8$;
- $R^{12}$ is, independently for each occurrence, selected from alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl, each optionally substituted with one or more substituents individually selected from $R^8$; and
- $R^8$ is, independently for each occurrence, selected from hydroxy, halogen, —CN, —NO$_2$, —SF$_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkylsulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl.

6. The composition of claim 1, wherein the hydrophobic amine is defined by Formula IIA Formula IIA wherein
- $R^{12}$ is, independently for each occurrence, selected from alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, each optionally substituted with one or more substituents individually selected from $R^8$;
- $R^8$ is, independently for each occurrence, selected from hydroxy, halogen, —CN, —NO$_2$, —SF$_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkylsulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl; and
- $R^{13}$ is alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, alkylaryl, heteroaryl, and alkylheteroaryl, each optionally substituted with one or more substituents individually selected from $R^8$.

7. The composition of claim 1, wherein the hydrophobic amine includes an ethylenically unsaturated moiety.

8. The composition of claim 1, wherein the hydrophobic amine is one of the following:

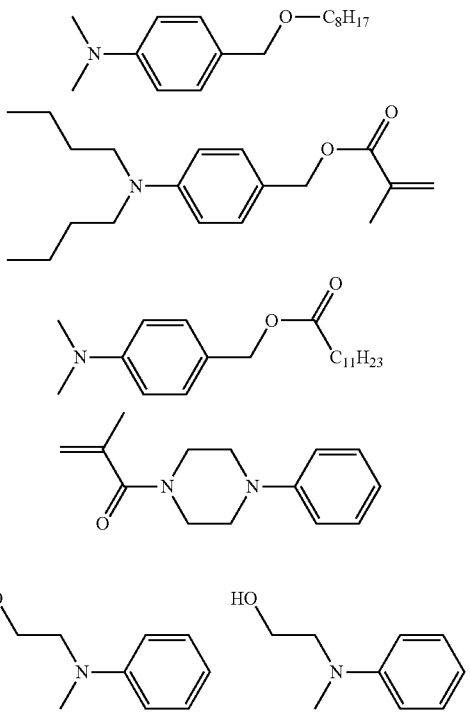

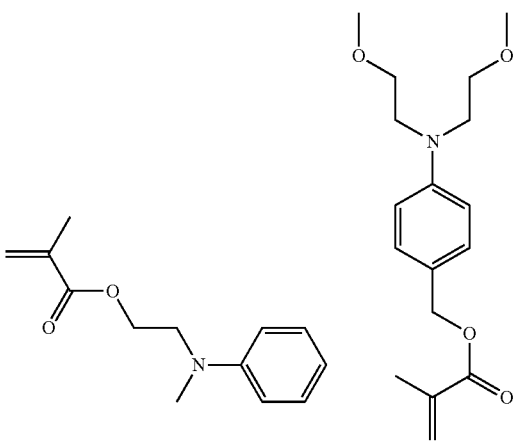

-continued

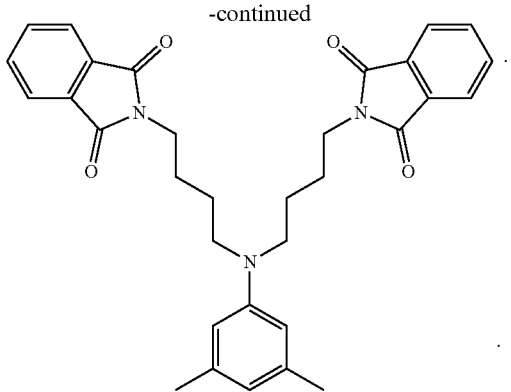

9. The composition of claim 1, wherein the microencapsulated hydrophobic amine comprises microcapsules encapsulating the hydrophobic amine, wherein the microcapsules are rupturable upon the application of a stimulus.

10. The composition of claim 9, wherein the stimulus comprises applied pressure, heat, or a combination thereof.

11. The composition of claim 9, wherein the microcapsules have a diameter of from 5 to 1000 microns.

12. The composition of claim 9, wherein the microcapsules have a shell thickness of from 1 nm to 100 nm.

13. The composition of claim 9, wherein the microcapsules are formed from poly(urea-formaldehyde).

14. The composition of claim 1,
wherein when packaged in the sealed container, the adhesive composition remains uncured for a period of at least 365 days.

15. The composition of claim 1, wherein the ethylenically unsaturated monomer comprises a urethane di(meth)acrylate.

16. The composition of claim 15, wherein the urethane di(meth)acrylate comprises from 30% to 70% by weight of the adhesive composition, based on the total weight of the adhesive composition.

17. The composition of claim 1, wherein the curable mixture further comprises an alkyleneoxy di(meth)acrylate.

18. The composition of claim 17, wherein the alkyleneoxy di(meth)acrylate comprises from 10% to 40% by weight of the adhesive composition, based on the total weight of the adhesive composition.

19. The composition of any of claim 1, wherein the hydrophobic amine comprises from 0.5% to 5% by weight of the adhesive composition, based on the total weight of the adhesive composition.

20. A single-component adhesive composition comprising:
a curable mixture comprising an ethylenically unsaturated monomer;
a microencapsulated hydrophobic amine having a molecular weight of at least 175 Da dispersed within the curable mixture; and
an oxidant that can generate a free radical upon reaction with the hydrophobic amine, such as a peroxide;
wherein the hydrophobic amine is defined by Formula IIA Formula IIA

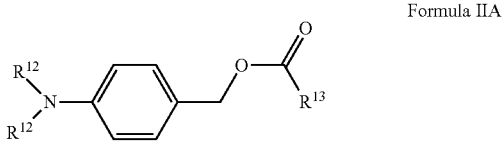

wherein
$R^{12}$ is, independently for each occurrence, selected from alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, heteroaryl, alkylheteroaryl, each optionally substituted with one or more substituents individually selected from $R^8$;
$R^8$ is, independently for each occurrence, selected from hydroxy, halogen, —CN, —NO$_2$, —SF$_5$, amino, alkylamino, dialkylamino, alkyl, haloalkyl; alkylthio, haloalkylthio, alkoxy, haloalkoxy, alkenyl, haloalkenyl, alkynyl, haloalkynyl, alkylsulfinyl, haloalkylsulfinyl, alkylsulfonyl, haloalkylsulfonyl, alkylcarbonyl, haloalkylcarbonyl, alkoxycarbonyl, haloalkoxycarbonyl, alkylaminocarbonyl, heteroalkylaminocarbonyl, dialkylaminocarbonyl, and heterodialkylaminocarbonyl; and
$R^{13}$ is alkyl, heteroalkyl, haloalkyl, alkenyl, haloalkenyl, alkynyl, haloalkynyl, cycloalkyl, alkylcycloalkyl, cycloalkylalkyl, heterocyclyl, alkylheterocyclyl, heterocyclylalkyl, aryl, alkylaryl, alkylaryl, heteroaryl, and alkylheteroaryl, each optionally substituted with one or more substituents individually selected from $R^8$.

* * * * *